(12) United States Patent
Tsuru

(10) Patent No.: US 12,430,785 B2
(45) Date of Patent: Sep. 30, 2025

(54) SHAPE MEASUREMENT DEVICE

(71) Applicant: Tokyo Seimitsu Co., Ltd., Tokyo (JP)

(72) Inventor: Taira Tsuru, Tsuchiura (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 18/845,314

(22) PCT Filed: Feb. 3, 2023

(86) PCT No.: PCT/JP2023/003617
§ 371 (c)(1),
(2) Date: Sep. 9, 2024

(87) PCT Pub. No.: WO2023/171192
PCT Pub. Date: Sep. 14, 2023

(65) Prior Publication Data
US 2025/0200777 A1 Jun. 19, 2025

(30) Foreign Application Priority Data
Mar. 9, 2022 (JP) ................... 2022-035892

(51) Int. Cl.
*G01B 11/24* (2006.01)
*G06T 7/593* (2017.01)
*H04N 23/695* (2023.01)

(52) U.S. Cl.
CPC ......... *G06T 7/593* (2017.01); *H04N 23/695* (2023.01); *G06T 2207/10012* (2013.01); *G06T 2207/10056* (2013.01); *G06T 2207/30148* (2013.01)

(58) Field of Classification Search
None
See application file for complete search history.

(56) References Cited

U.S. PATENT DOCUMENTS

2006/0109484 A1 5/2006 Akamatsu
2006/0253258 A1* 11/2006 Miyake .............. G01N 33/5005
435/6.12
(Continued)

FOREIGN PATENT DOCUMENTS

JP 2003-57016 A 2/2003
JP 2006-145487 A 6/2006
(Continued)

OTHER PUBLICATIONS

STIC provided translation of JP2021-025910 A (Year: 2021).*
(Continued)

*Primary Examiner* — Tyler W. Sullivan
(74) *Attorney, Agent, or Firm* — SALIWANCHIK, LLOYD & EISENSCHENK

(57) ABSTRACT

[Solution] A shape measurement device for acquiring a plurality of surface images while scanning a surface of a plate-shaped measurement object 1 and measuring a shape of the measurement object 1 includes: an imaging system 10 that irradiates the measurement object 1 with parallel light and acquires the surface image; a stage system 30 that holds the measurement object 1 and adjusts an attitude of the measurement object 1 with respect to the imaging system 10; and a control device 20. The control device 20 includes: an attitude adjustment unit 21 that controls the imaging system 10 and the stage system 30 to scan the surface while adjusting the attitude to obtain a plurality of surface images; and an image processing unit 22 that generates a restored model of a three-dimensional shape of the measurement object 1 from the plurality of acquired surface images. When acquiring the surface image, the attitude adjustment unit 21 adjusts the attitude so that an angle of incidence of the parallel light onto the surface falls within a predetermined range. According to the shape measurement device, it is possible to measure the shape of a plate-shaped measure- (Continued)

EDGE PORTION CROSS-SECTION
(FLAT STATE)

ment object, particularly a notch portion of a wafer having a complicated shape, with higher accuracy.

16 Claims, 23 Drawing Sheets

(56) References Cited

U.S. PATENT DOCUMENTS

| | | | |
|---|---|---|---|
| 2007/0259331 A1* | 11/2007 | Abeygunaratne | G01N 27/447 977/924 |
| 2010/0134615 A1 | 6/2010 | Akamatsu et al. | |
| 2010/0263599 A1* | 10/2010 | Yanik | G01N 33/5082 604/93.01 |
| 2019/0074221 A1* | 3/2019 | Nomaru | B23K 26/352 |
| 2020/0201011 A1 | 6/2020 | Gondaira | |
| 2021/0107112 A1* | 4/2021 | Kimura | H01L 21/687 |

FOREIGN PATENT DOCUMENTS

| | | | | |
|---|---|---|---|---|
| JP | 2009-25079 A | | 2/2009 | |
| JP | 6590429 B1 | | 10/2019 | |
| JP | 2021025910 A | * | 2/2021 | |
| WO | WO-2016076626 A1 | * | 5/2016 | ......... G01B 11/2441 |
| WO | 2016/098469 A1 | | 6/2016 | |

OTHER PUBLICATIONS

STIC provided translation of WO2016/076626 A1 (Year: 2016).*
International Search Report dated Apr. 18, 2023 in International Application No. PCT/JP2023/003617.

* cited by examiner

CROSS-SECTIONAL SHAPE
IS CONSTANT

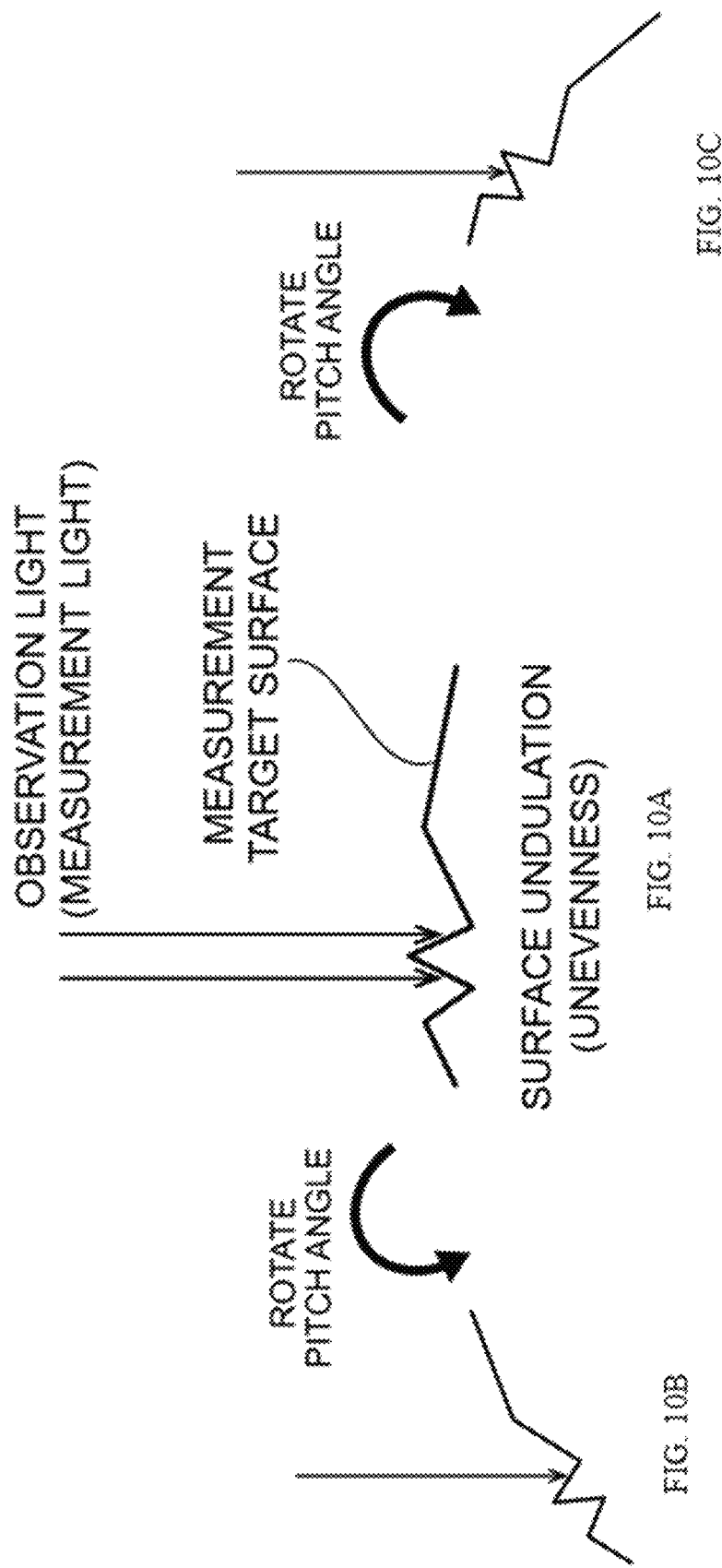

EDGE PORTION CROSS-SECTION
(FLAT STATE)

SHAPE MEASUREMENT DEVICE

CROSS-REFERENCE TO RELATED APPLICATIONS

This application is the U.S. national stage application of International Patent Application No. PCT/JP2023/003617, filed Feb. 3, 2023, which claims the benefit under 35 U.S.C. § 119 of Japanese Application No. 2022-035892, filed Mar. 9, 2022, the disclosures of each of which are incorporated herein by reference in their entirety.

TECHNICAL FIELD

The present invention relates to a device for measuring the shape of a plate-shaped measurement object, particularly the surface of a semiconductor wafer (hereinafter also simply referred to as "wafer"), and the shape of a chamfered end surface. The present invention particularly relates to a shape measurement device that measures the three-dimensional shape of a notch portion.

BACKGROUND ART

Regarding semiconductor wafers manufactured through processes such as grinding, etching, and polishing, there is a need to measure the edge profile of work-in-progress and/or products after each process is completed. An optical projection measurement method is known as a method for measuring this edge profile.

In the optical projection measurement method, light is projected onto the chamfered edge of the wafer from a direction approximately parallel to the front and back surfaces of the wafer, and a camera captures a projected image (cross-sectional shape cut in the thickness direction) of the end surface of the wafer from the direction opposite to the light projection direction.

PTL 1 describes that when measuring the shape of an end surface of a semiconductor wafer or the like based on its projected image, predetermined image processing is performed for each of the projected images at a plurality of set angles. It is explained that this allows correct shape measurement to be performed without being affected by deposits present on the end surface.

Further, PTL 2 discloses that when measuring the two-dimensional shape of the edge portion of the outer peripheral portion of a semiconductor wafer having a long depth along the optical axis direction, a collimator lens is used to irradiate parallel light as close to perfect as possible. It is explained that this inhibits blurring of the outline and generation of diffraction fringes in the projected image.

CITATION LIST

Patent Literature

PTL 1: Japanese Patent Application Publication No. 2009-25079
PTL 2: Japanese Patent Application Publication No. 2006-145487

SUMMARY OF INVENTION

Technical Problem

In the above-mentioned conventional techniques described in PTLs 1 and 2, only the top surface shape (two-dimensional shape) of the notch portion of the wafer can be measured. Therefore, the three-dimensional shape of the notch portion, which is a more complicated shape, could not be accurately measured. In addition, the outline of the peripheral edge other than the notch portion is blurred due to wafer alignment (attitude), crystal orientation, light diffraction (light bending), and the like, and the accuracy of shape measurement is not sufficient.

Therefore, an object of the present invention is to provide a shape measurement device that can measure the shape of a plate-shaped measurement object, particularly a notch portion of a wafer having a complicated shape, with higher accuracy.

Solution to Problem

As a result of intensive studies to solve the above-mentioned problems, the present inventors have found that the above-mentioned problems could be solved by the following configuration.

[1] A shape measurement device for acquiring a plurality of surface images while scanning a surface of a plate-shaped measurement object and measuring a shape of the measurement object, the shape measurement device comprising: an imaging system that irradiates the measurement object with parallel light and acquires the surface image; a stage system that holds the measurement object and adjusts an attitude of the measurement object with respect to the imaging system; and a control device, wherein the control device includes: an attitude adjustment unit that controls the imaging system and the stage system to scan the surface while adjusting the attitude to obtain a plurality of surface images; and an image processing unit that generates a restored model of a three-dimensional shape of the measurement object from the plurality of surface images acquired, and when acquiring the surface image, the attitude adjustment unit adjusts the attitude so that an angle of incidence of the parallel light onto the surface falls within a predetermined range.

[2] The shape measurement device according to [1], wherein the attitude adjustment unit determines an amount of adjustment based on design data of a three-dimensional shape of the measurement object that is stored in advance.

[3] The shape measurement device according to [1] or [2], wherein the stage system includes a chuck table having a five-axis structure including three axes, an X-axis, a Y-axis, and a Z-axis, as well as two axes, a yaw axis for rotation and a pitch axis for tilting.

[4] The shape measurement device according to [1] or [2], further including: a plurality of the imaging systems; and an imaging system switching mechanism that switches the imaging systems, wherein the control device switches the imaging system to be used to the imaging system determined in advance based on a correspondence relationship with the measurement object.

[5] The shape measurement device according to [4], wherein the measurement object is a wafer, the imaging system includes at least two or more types selected from the group consisting of one for acquiring white interference microscopic images, one for acquiring confocal microscopic images, and one for acquiring images by a photometric stereo method using a polarizing plate, and the control device switches the imaging system to: the imaging system for acquiring white interference microscopic images when the wafer is a wafer after grinding process; and the imaging system for acquiring confocal microscopic images when the wafer is a wafer after etching process; and the imaging system for acquiring images by a photometric stereo method when the wafer is a wafer after polishing process.

[6] The shape measurement device according to [3], wherein the measurement object is a wafer, and when acquiring the surface image of an edge portion of the wafer, the attitude adjustment unit executes: rotating the pitch axis with respect to an inclined surface or an end surface to adjust the angle of incidence, and acquiring the surface image while allowing the imaging system to scan in the X-axis direction; and rotating the yaw axis to acquire the surface image of an outer peripheral portion.

[7] The shape measurement device according to [6], wherein when acquiring the surface image of an R section of the wafer, the attitude adjustment unit divides the pitch axis into rotational increments of a predetermined pitch angle to obtain the surface image.

[8] The shape measurement device according to [3], wherein the measurement object is a wafer, and when acquiring the surface image of a single R section of a notch portion of the wafer, the attitude adjustment unit fixes a focal length of the imaging system, places the imaging system on an optical axis passing through a center of the single R section, and rotates the yaw axis to acquire the surface image.

[9] The shape measurement device according to [3], wherein the measurement object is a wafer, and when acquiring the surface image of a straight section of a notch portion, the attitude adjustment unit fixes a focal length of the imaging system and the yaw axis and adjusts the angle of incidence.

The shape measurement device according to [3], wherein the measurement object is a wafer, and when acquiring the surface image of a bottom R section of a notch portion of the wafer, the attitude adjustment unit fixes a focal length of the imaging system, places the imaging system on an optical axis passing through a center of the bottom R section, and acquires the surface image while scanning in the Z-axis and Y-axis directions.

Effect of the Invention

According to the present invention, it is possible to provide a shape measurement device that can measure the shape of a plate-shaped measurement object, particularly, even if a notch portion of a wafer has a complicated shape, with higher accuracy.

BRIEF DESCRIPTION OF DRAWINGS

FIG. 10A is an explanatory diagram showing the case in which data is missing while acquiring a surface image.

FIG. 10B is an explanatory diagram showing a method for acquiring a surface image when data is missing.

FIG. 10C is an explanatory diagram showing a method for acquiring a surface image when data is missing.

DESCRIPTION OF EMBODIMENTS

The present invention will be explained in detail below.

The following constituents will be described based on the typical embodiments of the present invention in some cases, but the present invention is not limited to the embodiments.

In the present specification, a range of numerical values described using "to" means a range including numerical values listed before and after "to" as a lower limit and an upper limit.

In addition, the embodiments shown below are examples that embody the technical idea of the present invention, and the technical idea of the present invention does not limit the material, shape, structure, arrangement, and the like of the components to the embodiments described below. Furthermore, the drawings are schematic. Therefore, the relationships of thickness and planar dimensions, ratios, and the like may differ from those in reality, and the relationships of dimensions and ratios may also differ between each of drawings.

[Shape Measurement Device]

A shape measurement device according to an embodiment of the present invention (hereinafter also referred to as "the present shape measurement device") is a shape measurement device for acquiring a plurality of surface images while scanning a surface of a plate-shaped measurement object and measuring a shape of the measurement object, the shape measurement device including: an imaging system that irradiates the measurement object with parallel light and acquires the surface image; a stage system that holds the measurement object and adjusts an attitude of the measurement object with respect to the imaging system; and a control device, wherein the control device includes: an attitude adjustment unit that controls the imaging system and the stage system to scan the surface while adjusting the attitude to obtain a plurality of the surface images; and an image processing unit that generates a restored model of a three-dimensional shape of the measurement object from the plurality of acquired surface images, and when acquiring the surface image, the attitude adjustment unit adjusts the attitude so that an angle of incidence of the parallel light onto the surface falls within a predetermined range.

Figure 1:
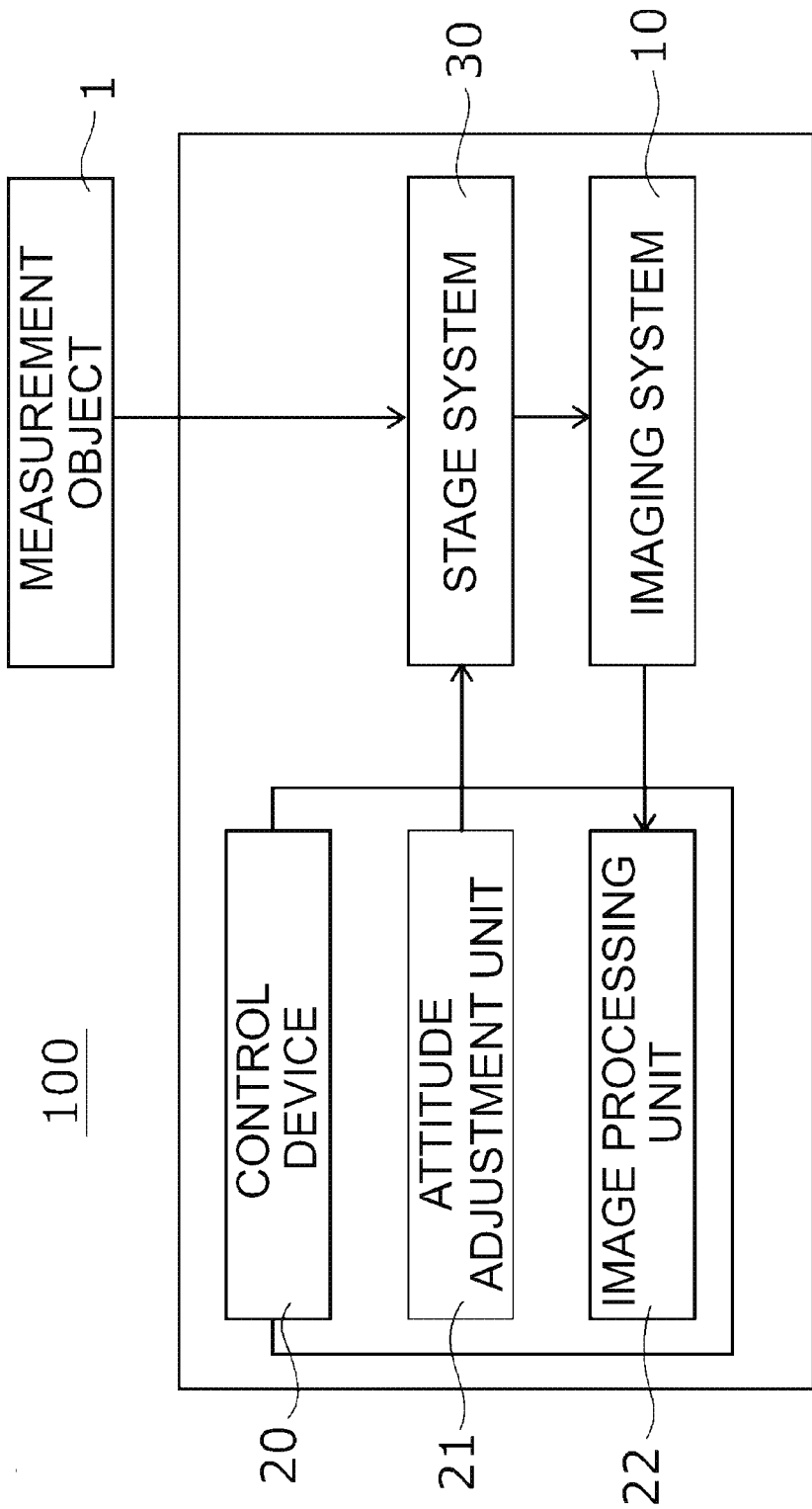
FIG. 1 is a functional block diagram of a shape measurement device according to an embodiment of the present invention.

FIG. 1 is a functional block diagram of the present shape measurement device. The shape measurement device 100 includes a stage system 30 that holds a plate-shaped measurement object 1 (typically, a work-in-progress after various processes and/or a product wafer is preferable) and controls its attitude, an imaging system 10 that irradiates the measurement object 1 with parallel light and acquires a surface image, and a control device 20. The control device 20 includes an attitude adjustment unit 21 that controls the imaging system 10 and the stage system 30 to scan the surface of the measurement object 1 while adjusting the attitude of the measurement object 1, and to acquire a plurality of surface images and an image processing unit 22 that generates a restored model of a three-dimensional shape of the measurement object 1.

Although the material, shape, size, and the like of the plate-shaped measurement object 1 are not particularly limited, a semiconductor wafer (also simply referred to as a "wafer") is typically preferable. The semiconductor wafer may be one that is cut out from an ingot; one that has undergone various processes such as grinding, etching, and polishing; or a finished product that has undergone each process. Furthermore, the material is not particularly limited, and may be any of single crystal silicon, sapphire, silicon carbide, gallium phosphide (GaP), gallium arsenide (GaAs), indium phosphide (InP), gallium nitride (GaN), and the like.

The imaging system 10 has a function of irradiating the measurement object 1 with parallel light and acquiring a surface image of the measurement object 1. It is preferable that the imaging system 10 typically includes a camera, a collimated light source, a beam splitter, and a condensing optical system.

Note that the shape measurement device 100 in FIG. 1 includes one imaging system 10. However, the shape measurement device 100 of the present invention may have a plurality of imaging systems 10. In that case, the shape measurement device 100 may have an imaging system switching mechanism for switching and using the plurality of imaging systems 10.

When the shape measurement device 100 has a plurality of imaging systems 10, it is preferable that each of the imaging systems 10 is used appropriately depending on the type of the measurement object 1. Specifically, it is preferable that the control device 20 switches to a predetermined imaging system 10 based on the correspondence with the measurement object 1.

For example, when the measurement object 1 is a wafer that has been subjected to a grinding process, the surface of the measurement object 1 has many grinding marks caused by a grinding tool, and the light irradiated onto the surface of the measurement object 1 is diffusely reflected. In other words, the surface of the wafer after the grinding process has a surface state in which diffuse reflection is dominant. In such a case, in order to acquire a surface image more accurately and more efficiently, it is preferable to use the imaging system 10 for acquiring a white interference microscopic image.

Figure 2:
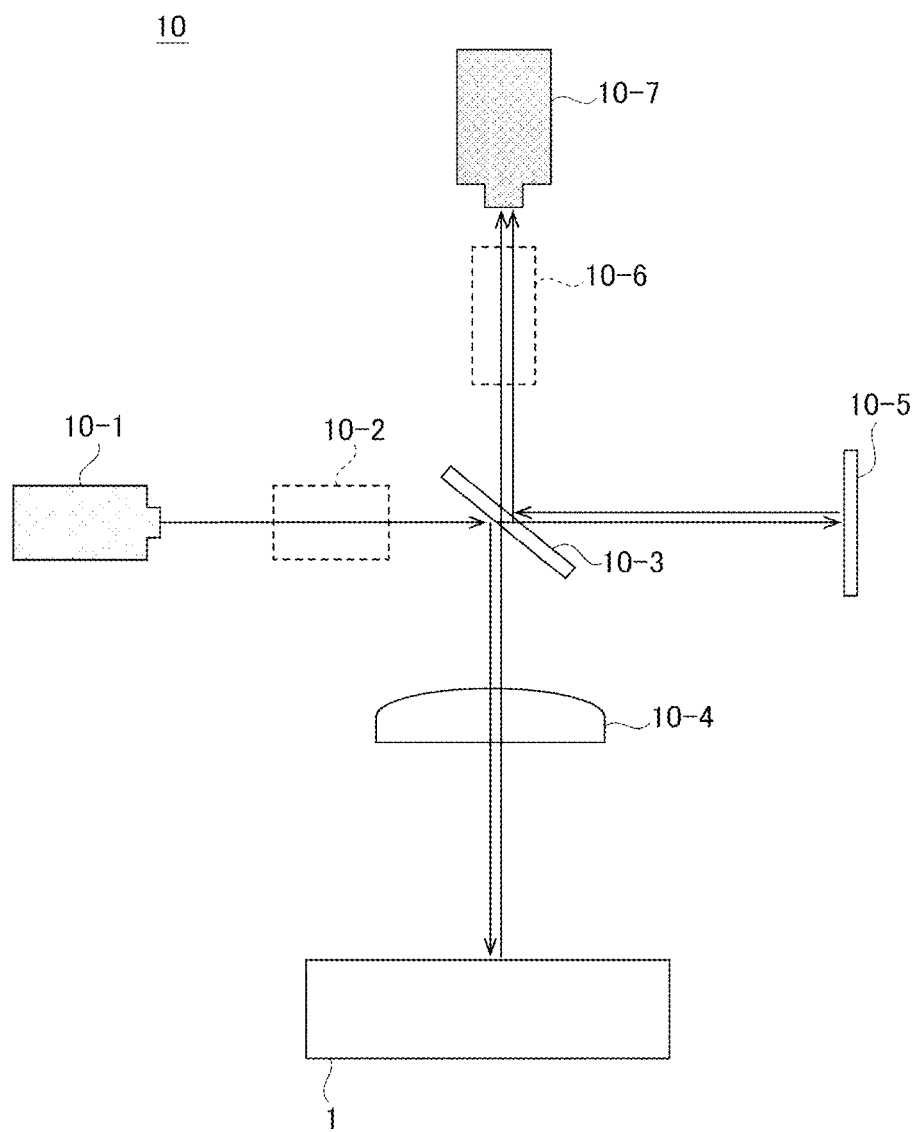
FIG. 2 is a basic configuration diagram of an imaging system for acquiring white interference microscopic images.

FIG. 2 is a basic configuration diagram of the imaging system 10 for acquiring white interference microscopic images. Light from a light source 10-1 (laser or light-emitting diode: LED) having a Gaussian beam profile is passed through a collimating optical system 10-2 (for example, a beam expander or the like) that collimates the diverging light, a beam splitter 10-3, and an objective lens 10-4 and is irradiated onto the measurement object 1. Note that the light source 10-1 may be a parallel light source, and in that case, the imaging system 10 does not need to have the collimating optical system 10-2.

The camera 10-7 images the two lights which are returned to the same optical path. The one light is reflected from the measurement object 1 and passed through the objective lens 10-4, the beam splitter 10-3, the condensing optical system 10-6 (for example, a condensing lens or the like). And another light is reflected by a reference mirror 10-5. When the light reflected from the measurement object 1 and the light reflected by the reference mirror 10-5 overlap, a spatial interference pattern (interference fringes) is obtained. The interference fringes have information on the optical path difference between the two light components. By analyzing the contrast changes and phase changes of the interference fringes that appear when the objective lens 10-4 is scanned in the vertical direction, surface unevenness shape data can be obtained.

On the other hand, for example, if the measurement object 1 is a wafer that has undergone an etching process (for example, alkaline etching process), due to the distribution of crystal orientation on the surface and the presence of etch pits, and the reflection characteristics of the surface (direct reflection and diffuse reflection characteristics of irradiated light) may be locally different (different reflection characteristics coexist).

In such a case, in order to acquire surface images more accurately and more efficiently, it is preferable to use the imaging system 10 for acquiring confocal microscopic images.

Figure 3:
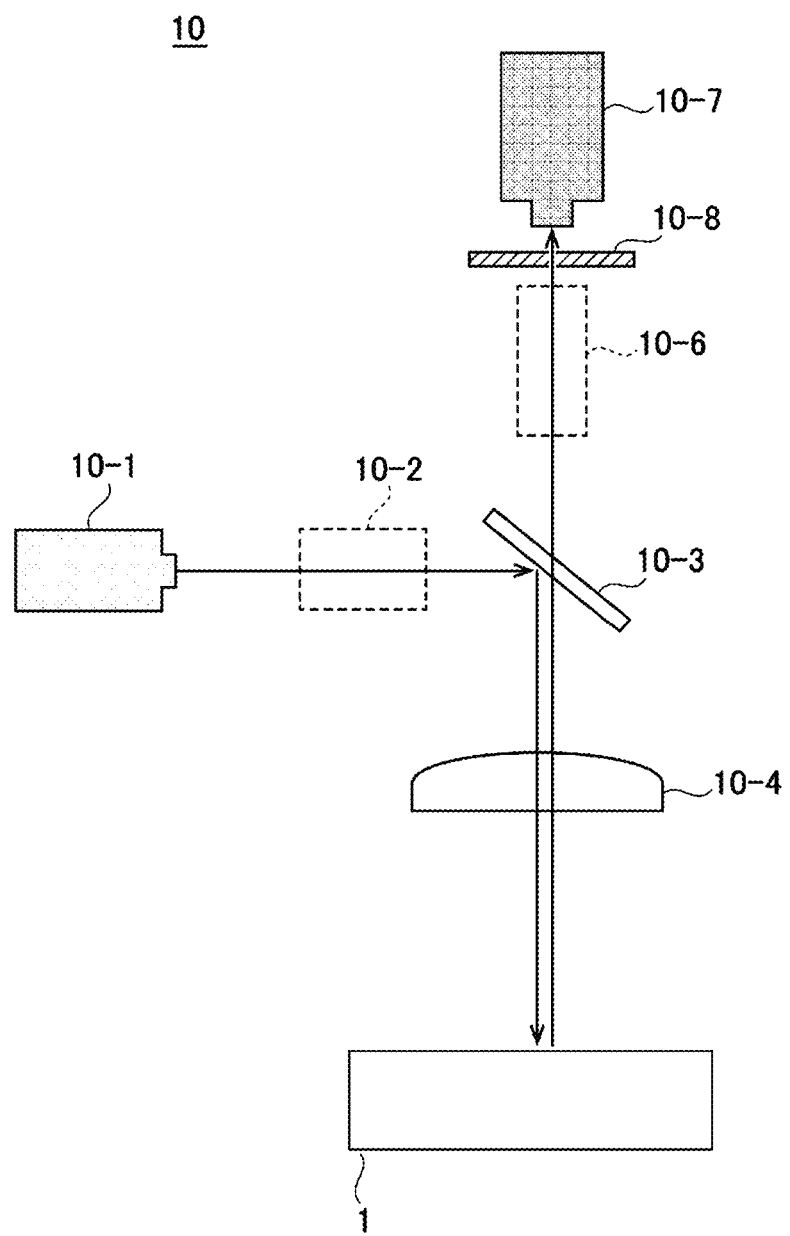
FIG. 3 is a basic configuration diagram of an imaging system for acquiring confocal microscopic images.

FIG. 3 is a basic configuration diagram of the imaging system 10 for acquiring confocal microscopic images. The imaging system 10 for acquiring a confocal microscopic image acquires a three-dimensional image using an optical microscope that has a shallow depth of focus and uses a pinhole confocal optical system. The light from the light source 10-1 passes through the collimating optical system 10-2 which collimates the diverging light as in FIG. 2, the beam splitter 10-3, and the objective lens 10-4, and is irradiated onto the measurement object 1. A pinhole 10-8 is placed in front of the light source 10-1 and the camera 10-7. Therefore, the camera 10-7 images the light reflected from the measurement object 1 and passed through the objective lens 10-4, the beam splitter 10-3, the condensing optical system 10-6, and the pinhole 10-8.

As a result, the out-of-focus image is blocked by the pinhole 10-8, and a strong signal is not obtained, and as a result, only the in-focus image is obtained. When performing three-dimensional measurement, the beam is scanned in the horizontal direction and then scanned in the vertical direction in order to capture the surface. An in-focus image is typically acquired by the following procedure. The step interval in the vertical direction is set and the captured images of the surface at each height are acquired. At this time, the peak position of the photodetection intensity becomes the height of the surface of a target sample. This captured image is converted into three-dimensional surface shape data and saved by an image processing unit 22 which will be described later.

Further, for example, when the measurement object 1 is a wafer that has been subjected to polishing process, the surface is prepared in a mirror-like state, so that direct reflection becomes dominant.

In such a case, in order to acquire a surface image more accurately and more efficiently, it is preferable to use the imaging system 10 for acquiring images by a photometric stereo method using a polarizing plate.

Figure 4:
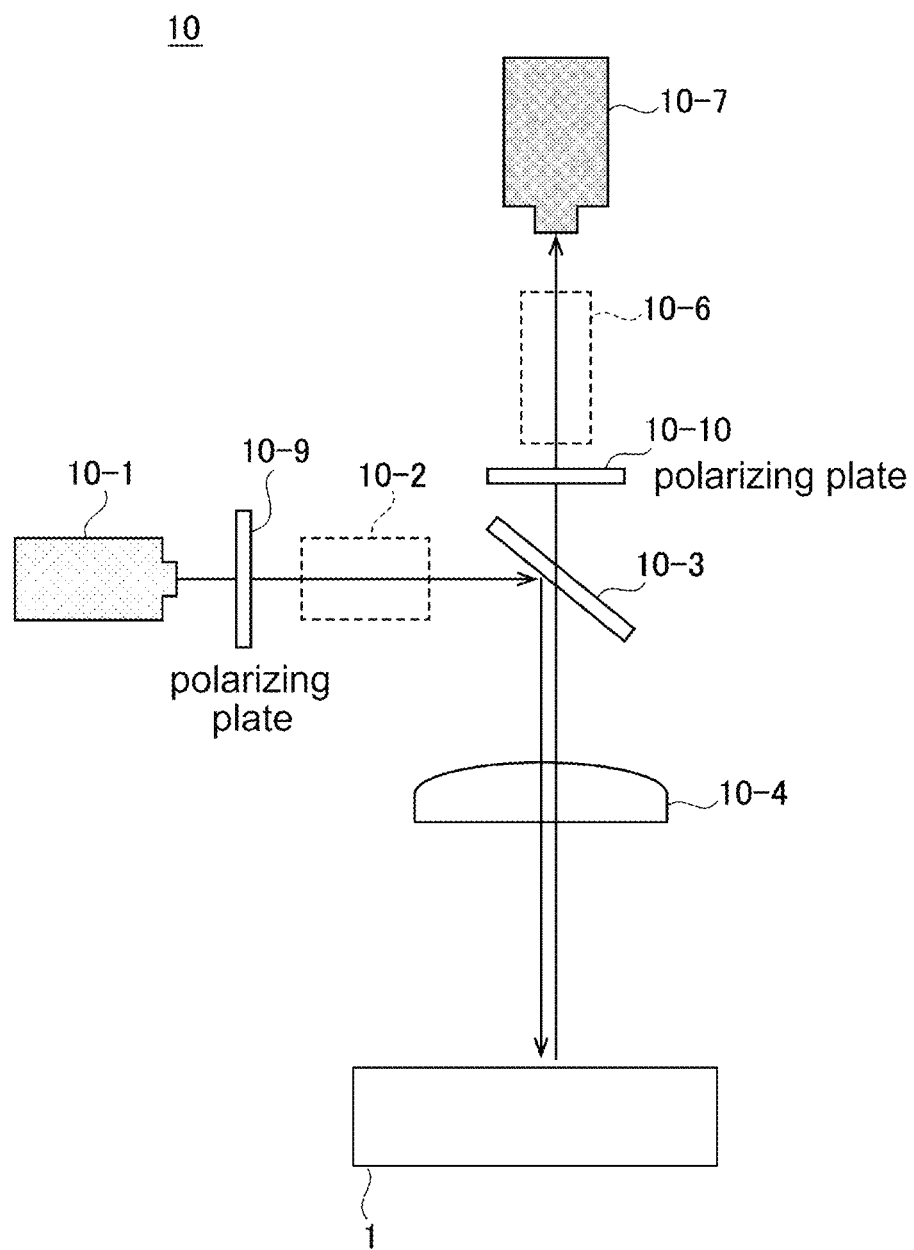
FIG. 4 is a basic configuration diagram of an imaging system for acquiring images using a photometric stereo method.

FIG. 4 is a basic configuration diagram of an imaging system 10 for acquiring images using the photometric stereo method. In the photometric stereo method, a normal vector, which is three-dimensional shape information of an object surface, is measured from a plurality of images taken while changing the position of the light source 10-1.

When the surface of the measurement object 1 is a mirror surface, direct reflection becomes dominant. At this time, it is difficult for the optical system for obtaining white interference microscopic images and the optical system for obtaining confocal microscopic images to obtain accurate images, and it is desirable to use the photometric stereo method and remove highlights, which are areas with high brightness due to gloss.

Light from the light source 10-1 passes through the polarizing plate 10-9, the collimating optical system 10-2, the beam splitter 10-3, and the objective lens 10-4, and is irradiated onto the measurement object 1. The camera 10-7 images the light reflected from the measurement object 1 and passed through the objective lens 10-4, the beam splitter 10-3, the polarizing plate 10-10, and the condensing optical system 10-6. The polarizing plate 10-9 and the polarizing plate 10-10 are arranged so that their polarization axes are perpendicular to each other at 90° (crossed-Nicol arrangement).

With this optical arrangement, the reflection of the light source 10-1 caused by the specularly reflected light (linearly polarized light) on the measurement object 1 is removed, and only the diffusely reflected light (unpolarized light) reaches the camera 10-7. As a result, harmful "glare" or "shininess" caused by the reflection of the light source 10-1 is removed or reduced.

Returning to FIG. 1, the stage system 30 preferably has the function of holding the measurement object 1 and adjusting the attitude of the object 1 with respect to the imaging system 10, and typically includes a chuck table having a five-axis structure including three axes, the X-axis, Y-axis, and Z-axis, as well as two axes, a yaw axis for rotation and a pitch axis for tilting.

Figure 5:
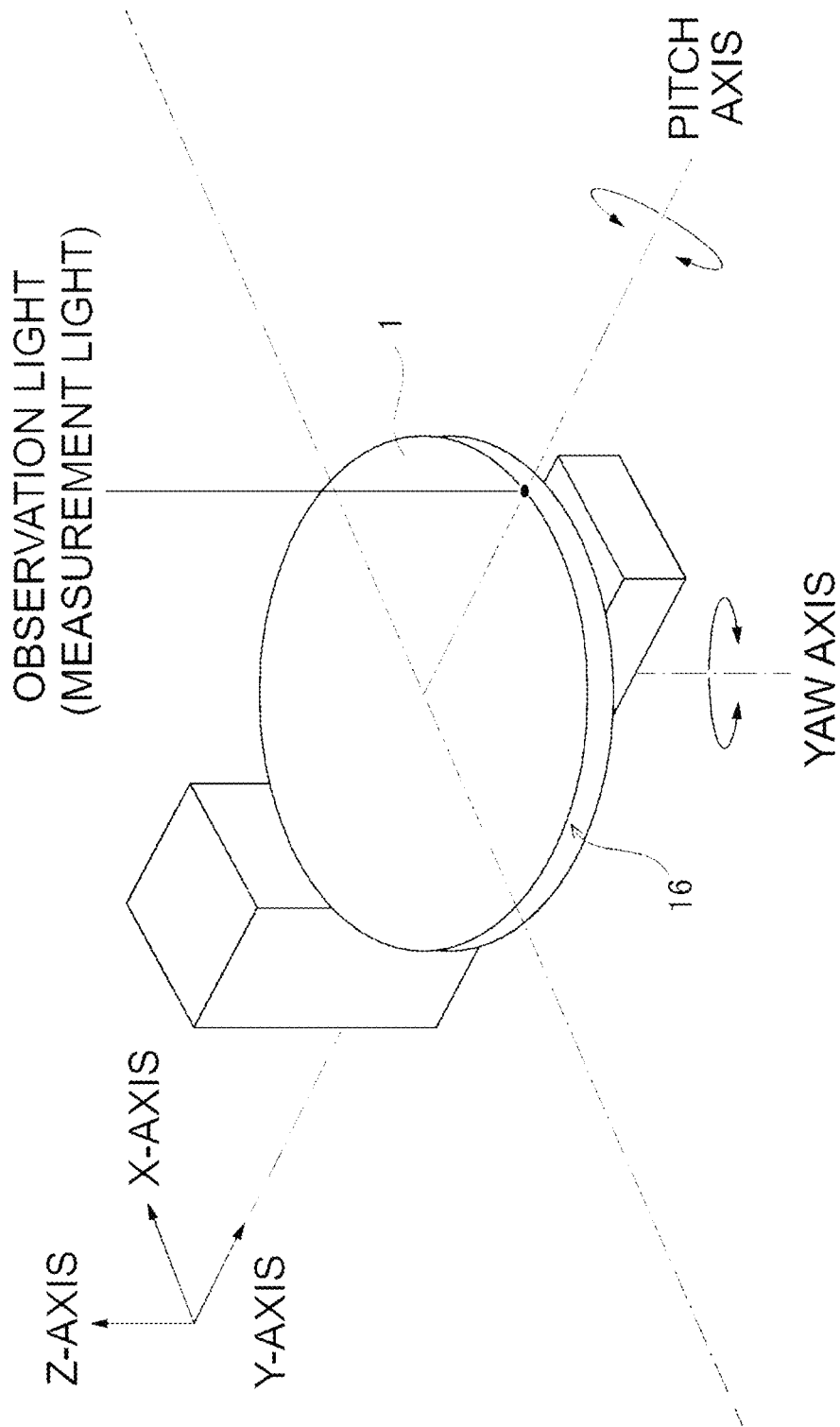
FIG. 5 is a perspective view showing the configuration of a stage system.

FIG. 5 is a perspective view showing the configuration of the stage system 30. Since a chuck table 16 that holds the measurement object 1, which is a wafer, is an attitude changing mechanism that can move in five axes, including the X-axis, Y-axis, and Z-axis as well as two axes, yaw axis and pitch axis, a surface image can be obtained by irradiating the entire surface of the measurement object 1 with measurement light from the imaging system 10.

Figure 6:
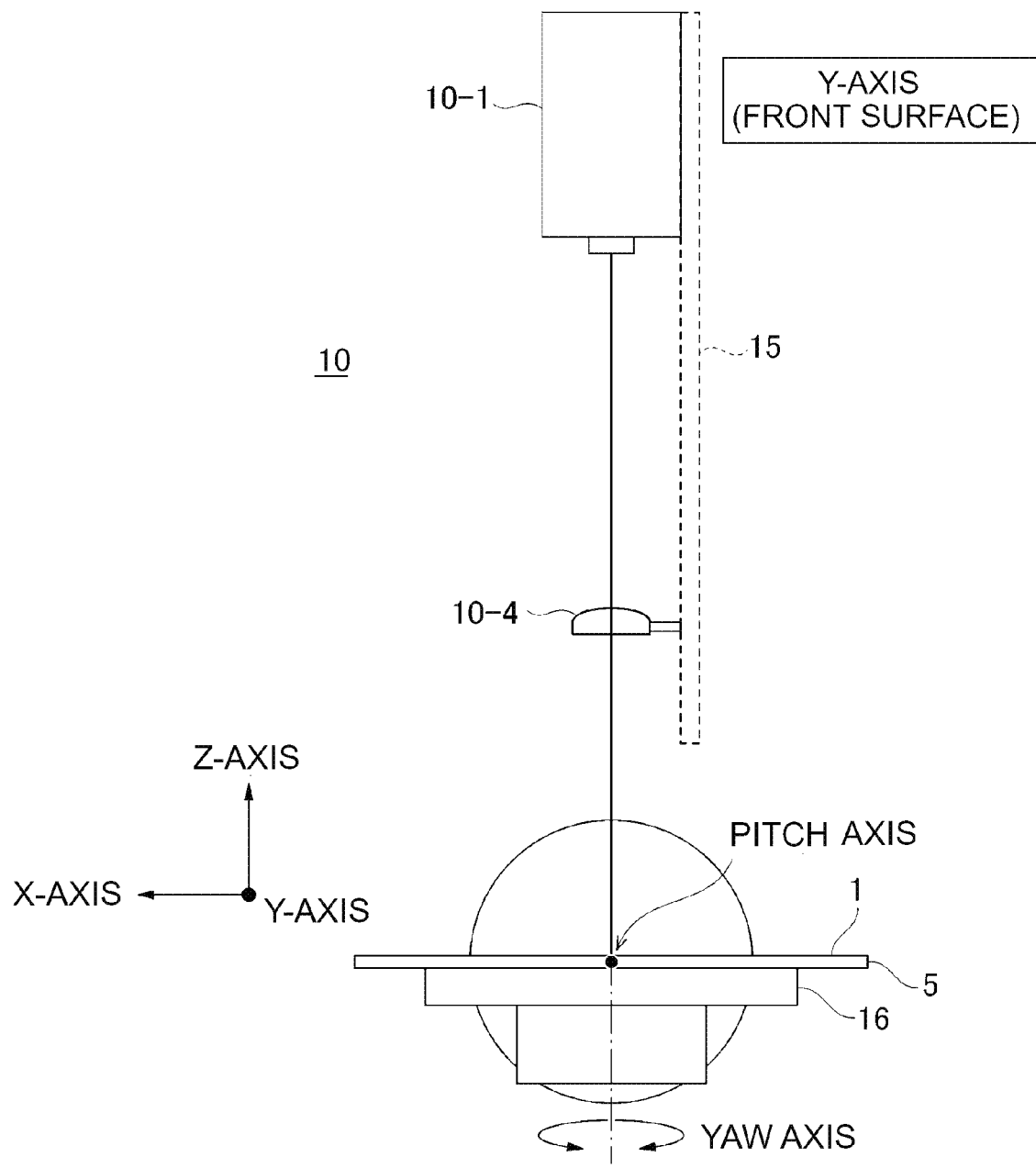
FIG. 6 is a configuration diagram seen from the front along the Y-axis, showing the relationship between an imaging system and a measurement object.

FIG. 6 is a configuration diagram seen from the front on the Y axis, showing the relationship between the imaging system 10 and the measurement object 1.

The imaging system 10 shown in FIGS. 2, 3, and 4 is fixed to a baseboard 15. The chuck table 16 that holds the measurement object 1 and changes its attitude is preferably of a vacuum chuck type, and has a 5-axis structure including two axes, a yaw axis for rotation and a pitch axis for tilting in addition to the three axes, the X, Y, and Z axes. Therefore, the surface of the measurement object 1 can be scanned gradually at the scan pitch P in the X-axis direction and a surface image can be obtained.

Furthermore, the edge portion 5 of the outer peripheral portion of the measurement object 1 is imaged by rotating the pitch axis with respect to the inclined surface and the end surface so that the irradiation surface by the imaging system 10 is perpendicular (in other words, the angle of incidence is) 0°. Furthermore, the outer peripheral portion can be imaged all around by rotating the yaw axis by 360 degrees. Note that the imaging system 10 may be configured such that the baseboard 15 can be moved in the X-axis, Y-axis, and Z-axis directions.

Figure 7:
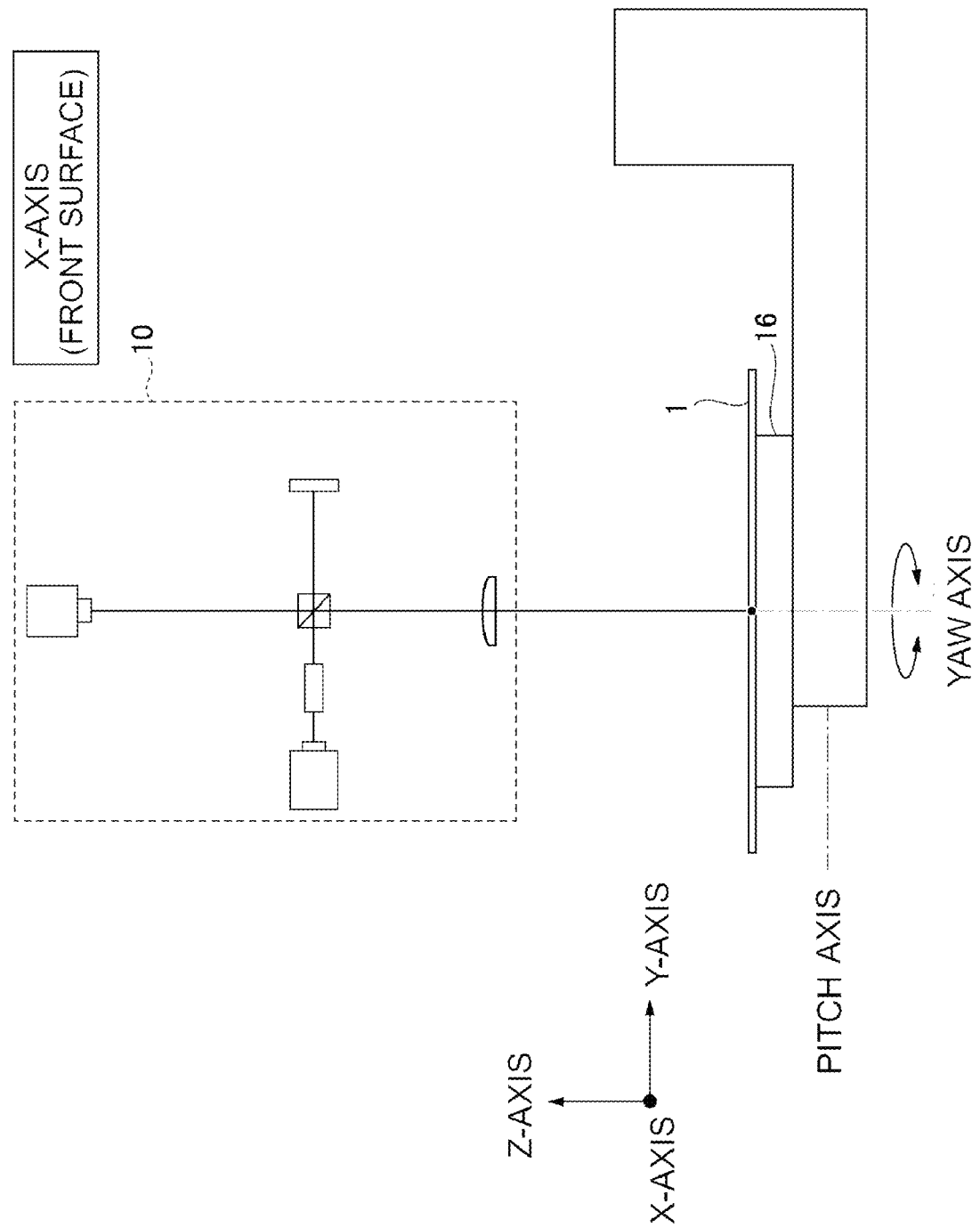
FIG. 7 is a configuration diagram seen from the front along the X-axis, showing the relationship between an imaging system and a measurement object.

FIG. 7 is a configuration diagram seen from the front on the X-axis, showing the relationship between the imaging system 10 and the measurement object 1. Similarly to FIG. 7, the surface of the measurement object 1 is scanned with measurement light, which is parallel light, gradually at a scan pitch P in the Y-axis direction whereby a surface image is obtained. Further, the edge portion 5 of the outer peripheral portion is imaged by rotating the pitch axis so that the irradiation surface is vertical (in other words, the angle of incidence is) 0°. Furthermore, the outer peripheral portion can be processed all around by rotating the yaw axis by 360 degrees.

Returning to FIG. 1, the control device 20 is typically a computer having a central processing unit (CPU), a memory, and the like, and when the CPU executes a program stored in the memory, the functions of the attitude adjustment unit 21 and the image processing unit 22 are realized.

The attitude adjustment unit 21 has a function of controlling the attitude of the measurement object 1 by controlling the stage system 30, and is realized by the CPU executing a program stored in the memory of the control device 20. When acquiring a surface image, the attitude adjustment unit 21 adjusts the attitude of the measurement object 1 with respect to the surface of the measurement object 1 so that the angle of incidence of parallel light to the surface of the measurement object 1 is within a predetermined range.

Generally, it is known that the imaging angle (incidence angle of parallel light) at which an accurate image can be obtained differs depending on the optical system (imaging method) of the imaging system 10. For example, in the case of imaging systems for acquiring white interference microscopic images, the Mirau type, the Michelson type, and other types are known, but it is known that these types have limitations on the range of imaging angles that allow accurate images to be obtained.

The present shape measurement device 100 has the attitude adjustment unit 21, and adjusts the angle of incidence (imaging angle) of parallel light with respect to the surface to be within a predetermined range according to the imaging system 10, so that more accurate images can be obtained.

Although the specific angle of incidence is not particularly limited, it is generally preferably 0 to 30°, more preferably 0 to 15°, and in one preferred embodiment, the angle of incidence is approximately 0°.

Note that the method by which the attitude adjustment unit 21 performs the above-described adjustment is not particularly limited, but it is preferable to carry out this method by determining the amount of adjustment based on the design data of the three-dimensional shape of the measurement object 1 stored in advance in the memory of the control device 20.

For example, when the measurement object 1 is a wafer, the design data for the three-dimensional shape of the measurement object may be a design drawing (specification) of a product wafer. This design data may typically include data on the outer shape of the wafer (an outer peripheral portion and a notch portion) and the three-dimensional shape of the notch portion. Specifically, an example is a form of a point group expressed in a three-dimensional orthogonal coordinate system.

The image processing unit 22 has a function of generating a restored model of the three-dimensional shape of the measurement object 1 from a plurality of surface images acquired while scanning the surface of the measurement object 1, and is realized by the CPU executing a program stored in the memory of the control device 20.

Surface images for three-dimensional restoration are obtained, for example, by using a laser beam as observation light (measurement light) and extracting and combining in-focus areas from multiple images obtained from an all-in-focus microscope system, that is, an image sensor. Furthermore, a high-resolution super-depth image can be obtained by generating an all-in-focus image in which all positions are in focus. Alternatively, the photometric stereo method can also be used in conjunction with detailed shape measurement of a portion with relatively small unevenness (where a difference in height due to slope is small, for example, a difference in height is 10 nanometers).

Next, the operation of the present shape measurement device 100 will be explained.

Figure 8:
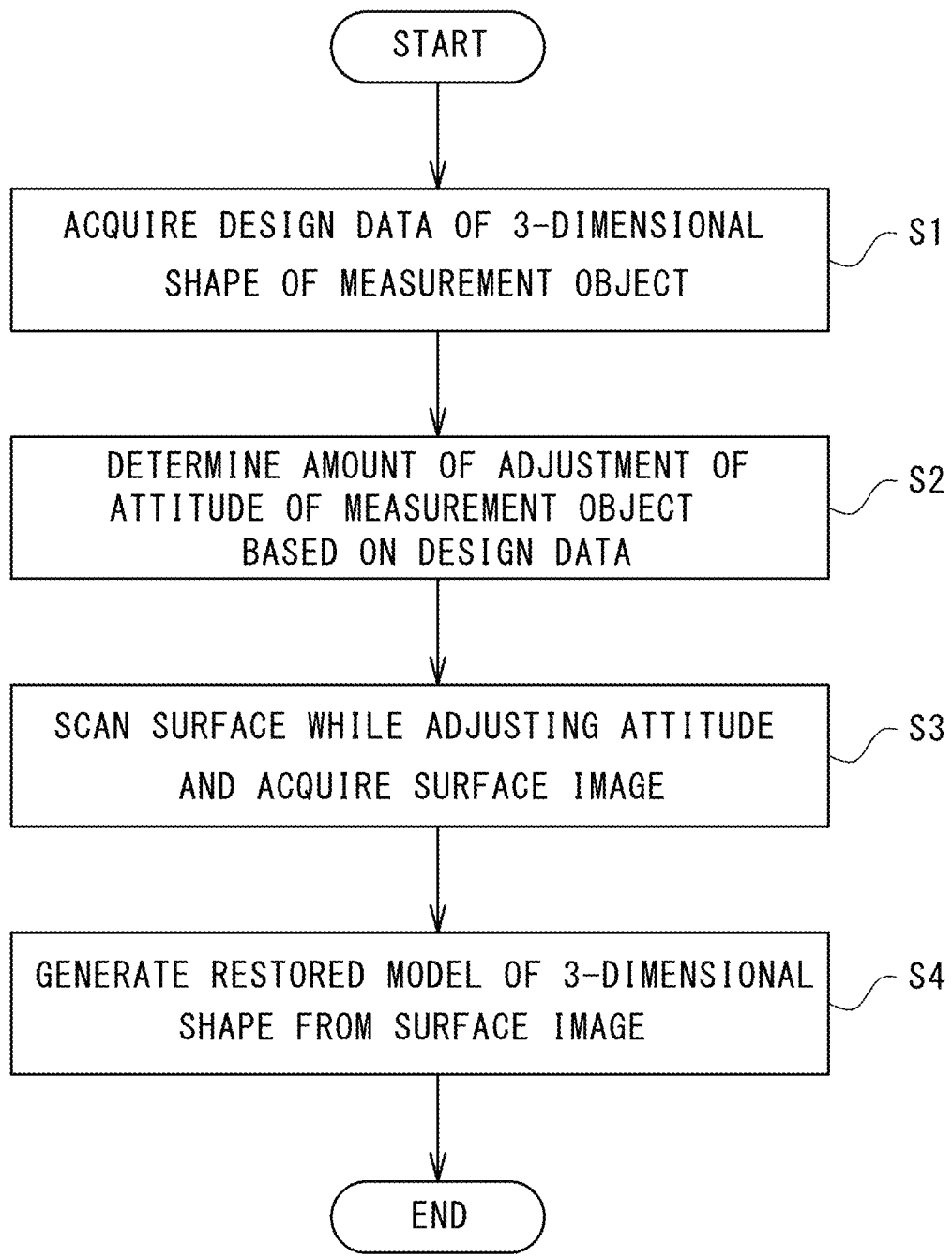
FIG. 8 is a flowchart showing a procedure for measuring the three-dimensional shape of a measurement object using a shape measurement device.

FIG. 8 is a flowchart showing a procedure for measuring the three-dimensional shape of the measurement object using the present shape measurement device 100.

First, in step S1, design data of the three-dimensional shape of the measurement object is acquired. The data acquisition method is not particularly limited, and may be a form in which the CPU reads out design data stored in memory in advance depending on the type of the measurement object, or the design data may be input from the outside depending on the measurement object 1 to be measured.

Next, in step S2, the amount of adjustment of the attitude of the measurement object 1 is determined by the attitude adjustment unit 21 controlled by the control device 20 based on the design data. In other words, the trajectory (imaging trajectory) of movement of the measurement object 1 with respect to the imaging system 10 is calculated. The above will be explained in detail later using specific examples.

Next, in step S3, the attitude adjustment unit 21 controls the imaging system 10 and the stage system 30 based on the imaging trajectory calculated in step S2, the surface of the measurement object 1 is scanned while adjusting the attitude of the measurement object 1, and the surface image of the measurement object 1 is obtained. At this time, the imaging position is adjusted so as to scan the surface of the measurement object 1, so that images covering a wide range of the surface of the measurement object 1 are acquired. Note that at this time, in addition to the stage system 30, the imaging system 10 may also be moved. By doing so, attitude adjustment can be performed more efficiently.

Next, in step S4, the image processing unit 22 forms a three-dimensional restored model from the plurality of surface images obtained in step S3.

The above measurement procedure will be further explained using an example in which the measurement object 1 is a wafer.

Figure 9A:
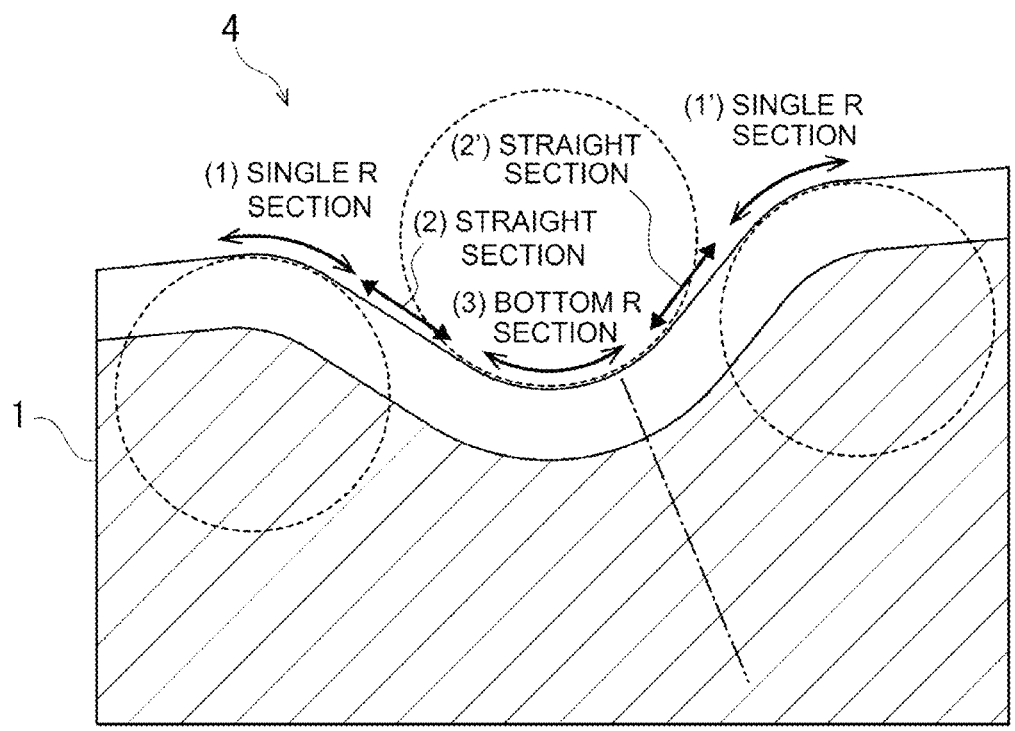
FIG. 9A is an explanatory diagram of a procedure for measuring the three-dimensional shape of a notch portion of a measurement object, which is a wafer.
Figure 9B:
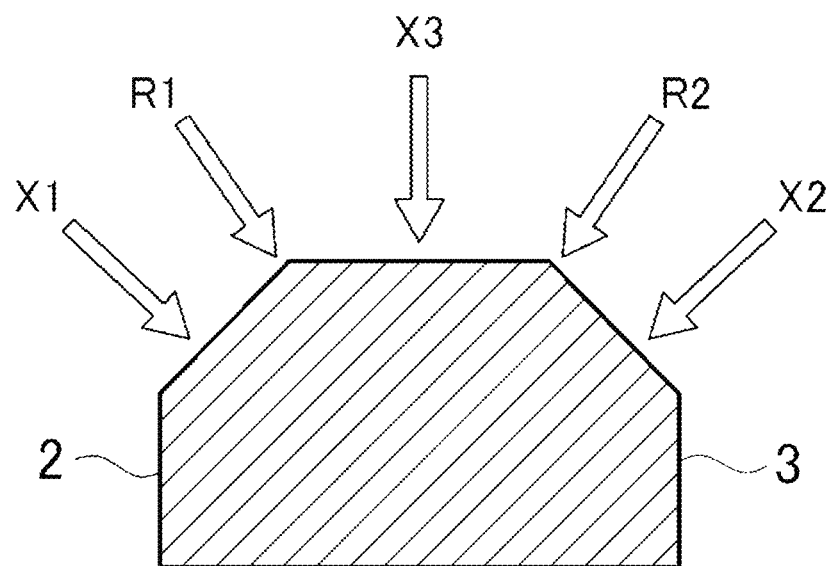
FIG. 9B is a cross-sectional view of the notch portion taken along a dashed line in FIG. 9A.

FIGS. 9A and 9B are explanatory diagrams of the procedure for measuring the three-dimensional shape of the notch portion 4 of the measurement object 1, which is a wafer. In recent years, semiconductor wafer production sites have been required to improve the quality of the shape and other areas down to the peripheral edge, and in particular, the shape of the notch portion 4 is prone to deformation due to processes such as grinding, etching, and polishing, which affects the yield in post-processes.

FIG. 9A is a plan view of the notch portion 4, and FIG. 9B is a cross-sectional view of the notch portion 4 taken along a dashed line. The notch portion 4 has a complicated three-dimensional shape, and is composed of, from the left end of FIG. 9A, a single R section (1), a straight section (2), a bottom R section (3), a straight section (2') having a different inclination direction from the straight section (2), and a single R section (1') symmetrical with the single R section (1).

In addition, the cross-sectional shape has an end surface X3 that is perpendicular to the upper surface 2 or lower surface 3 of the measurement object 1, which is a wafer. Inclined surfaces X1 and X2 are formed at both ends of this end surface X3, and R sections R1 and R2 are connected to these inclined surfaces (see FIG. 9B). X1 and X2 and R1 and R2 are symmetrical with respect to the midpoint X3. The upper surface 2 or lower surface 3, end surface X3, and inclined surfaces X1 and X2 of the measurement object 1 have different crystal orientations. Note that the cross-sectional shape of FIG. 9B is the same not only for the notch portion 4 but also for the edge portion 5 of the outer peripheral portion, and is constant all over the periphery.

Therefore, the attitudes of the imaging system 10 and the measurement object 1 are changed in accordance with the notch shape. Specifically, the imaging system 10 (the angle of incidence of parallel light) is made perpendicular to the surface shape of the notch portion 4. Based on the information acquired in step S1, the attitude adjustment unit 21 calculates the amount of attitude adjustment (imaging trajectory) of the measurement object 1 for the stage system 30

(step S2). In this way, the imaging system 10 is also made perpendicular to the surface of the notch portion 4.

The attitude adjustment amount is set by the following two viewpoints, as one form. One is to make the focal length of the imaging system 10 constant based on the information of the design data (point group data or the like based on an orthogonal coordinate system) acquired in step S1. The other is to ensure that the angle of incidence of the irradiated parallel light falls within a predetermined range. The attitude adjustment amount is determined by optimizing the optical imaging (image acquisition) conditions of the surface shape according to the surface condition of the measurement object 1, based on the three-dimensional coordinates of the notch shape surface of which the design values are given.

Next, the imaging trajectory of the measurement object 1 is controlled based on the determined attitude adjustment amount, and the surface image of the measurement object 1 is acquired (step S3).

The chuck table 16 that holds the measurement object 1 and changes its attitude is preferably of a vacuum chuck type. As one form, it is preferable to have a five-axis structure in which two axes, a yaw axis for rotation and a pitch axis for tilting in addition to the three axes, the X, Y, and Z axes.

The present shape measurement device 100 can image a sharply uneven surface while adjusting the attitude of the measurement object 1 by the five-axis movement of the chuck table 16 and the attitude adjustment mechanism. In this way, the angle of the imaging system 10 (the angle of incidence of the irradiation light) can be controlled to fall within a predetermined range with respect to the surface shape. Therefore, it is possible to image the accurate surface shape of the measurement object 1 (obtain a surface image).

The slope shape of the surface of the measurement object 1 can be measured more accurately by examining the amount of reflected light from the surface irradiated with parallel measurement light.

After the processing in step S3, depth coordinates, which are three-dimensional coordinates, are obtained from the plurality of acquired surface images, three-dimensional restoration is performed, and a restored model is created (step S4).

After the restored model is created, it may be used for determining the quality with respect to the master wafer (workpiece) and for shape conditions in post-processing.

Surface images for three-dimensional restoration are obtained by using, for example, a laser beam as observation light (measurement light) and extracting and combining in-focus areas from multiple images obtained from an all-in-focus microscope system, that is, an image sensor.

Furthermore, a high-resolution super-depth image can be obtained by generating an all-in-focus image in which all positions are in focus. Alternatively, the photometric stereo method can also be used in conjunction with detailed shape measurement of a portion with relatively small unevenness (where a difference in height due to slope is small, for example, a difference in height is approximately 10 nanometers).

FIGS. 10A-10C are explanatory diagrams showing a method for acquiring a surface image when data is missing. If the inclination of the surface unevenness is large, or if there are defects such as irregular etch pits, data may be missing. For example, existing optical surface texture measuring instruments have a numerical aperture NA of approximately 0.55, which represents the light collection limit in the absence of aberrations. If the inclination angle is 7.9° or more, the lens may not be able to capture a portion of the reflected light from the measurement target surface due to angle followability, which may result in data loss.

Therefore, in this case, the pitch angle of the measurement target surface is rotated in steps of 7 degrees or less to obtain a plurality of surface images taken at different imaging angles from the same location. If the measurement target surface has undulations (unevenness) as shown in FIG. 10A, the surface image in FIG. 10A, and a surface image obtained by rotating the measurement target surface counterclockwise as shown in FIG. 10B, and a surface image obtained by rotating the measurement target surface clockwise as shown in FIG. 10C are combined to integrate the obtained images. As a result, the surface image of the area of interest is obtained as a consistent shape with no missing data.

Figure 11A:
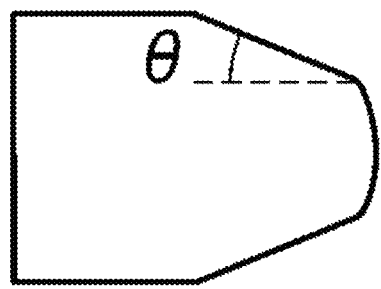
FIG. 11A is a cross-sectional view of an edge portion of the outer peripheral portion of measurement object in flat state.
Figure 11B:
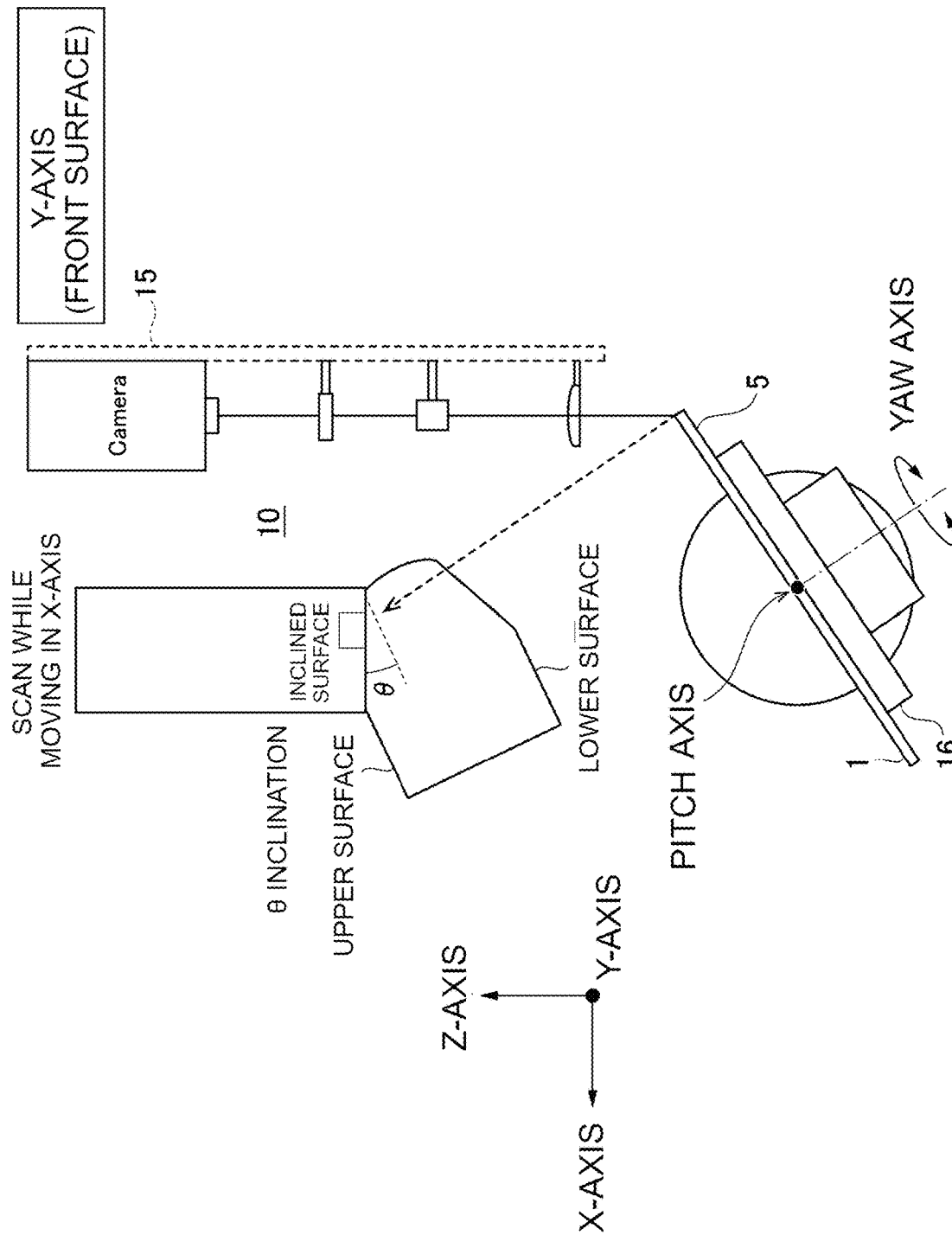
FIG. 11B is a Y-axis front view showing the relationship between an imaging system and a measurement object when measuring an edge portion of the outer peripheral portion.

FIG. 11B is a Y-axis front view showing the relationship between the imaging system 10 and the measurement object 1 when measuring the edge portion 5 of the outer peripheral portion. The cross-section of the edge portion 5 has an inclined surface (angle θ) as shown in FIG. 11A in a flat state. FIG. 11B is a diagram showing the measurement state of the inclined surface.

The attitude adjustment unit 21 rotates the chuck table 16 around the pitch axis so that the irradiation surface by the imaging system 10 is vertical (in other words, the angle of incidence is approximately) 0°, and the imaging system 10 is caused to acquire a surface image while allowing the imaging system 10 to perform scanning in the X-axis direction.

The attitude adjustment unit 21 rotates the chuck table 16 around the pitch axis so that the irradiation surface by the imaging system 10 is vertical (in other words, the angle of incidence is approximately) 0°, and the imaging system 10 is caused to acquire a surface image while allowing the imaging system 10 to perform scanning in the X-axis direction.

Figure 11C:
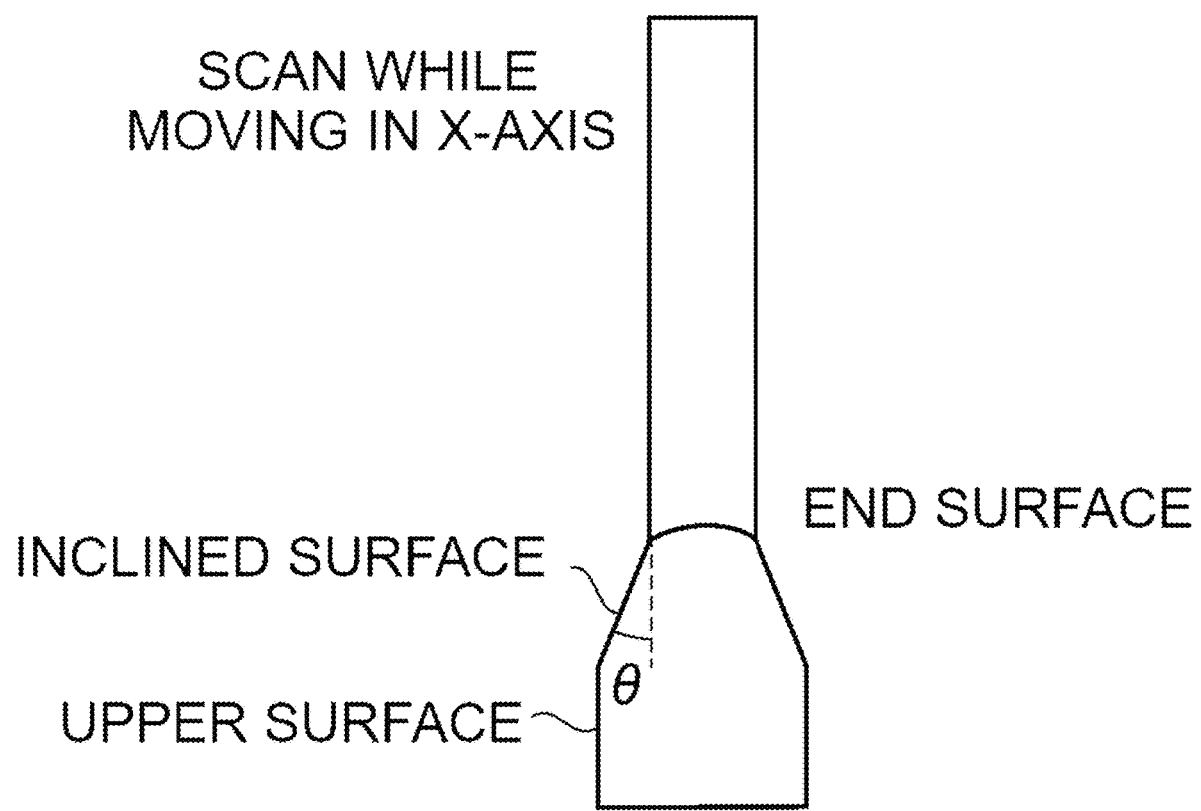
FIG. 11C is an explanatory diagram showing a method for acquiring a surface image of an end surface.

FIG. 11C shows the irradiation state of an end surface. Similarly to FIG. 11B, a surface image is obtained by rotating the pitch axis so that the angle of incidence of the parallel light is approximately 0° (within a predetermined range).

Furthermore, the chuck table 16 is rotated 360 degrees around the yaw axis to obtain a surface image of the outer peripheral portion.

Figure 12:
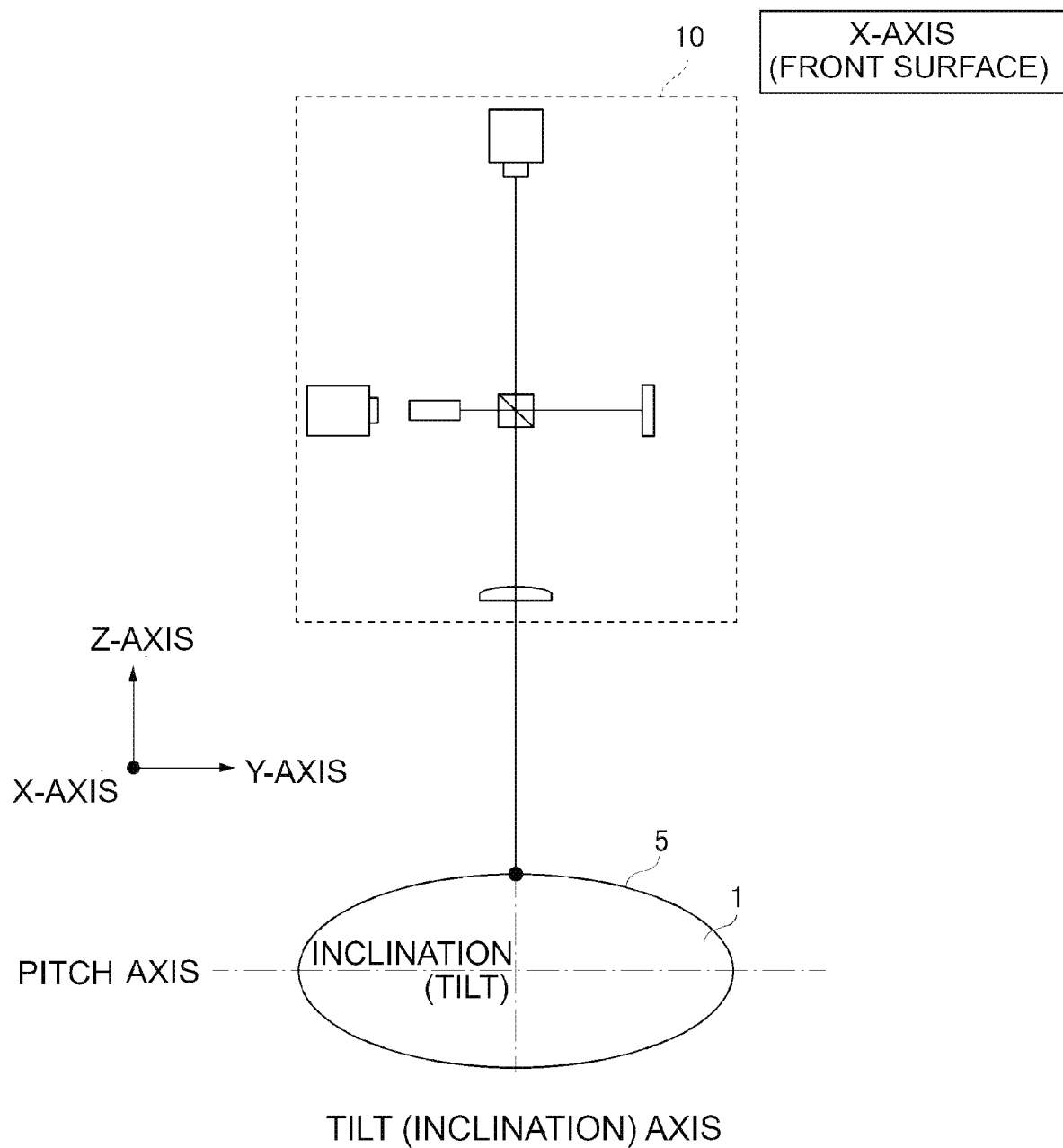
FIG. 12 is an X-axis front view showing the relationship between an imaging system and a measurement object when acquiring a surface image of an inclined surface of an edge portion of the outer peripheral portion.

FIG. 12 is an X-axis front view showing the relationship between the imaging system 10 and the measurement object 1 when acquiring a surface image of the inclined surface of the edge portion 5 of the outer peripheral portion. The measurement object 1 is held on the chuck table 16 similar to that shown in FIGS. 9A and 9B. When acquiring the surface image of the edge portion 5, the attitude adjustment unit 21 controls the attitude of the measurement object 1 around the pitch axis and the tilt (inclination) axis so that the angle of incidence of parallel light is within a predetermined range (for example, approximately) 0° and the surface image is acquired. Note that the irradiation conditions may be determined depending on the crystal orientation and shape.

Figure 13:
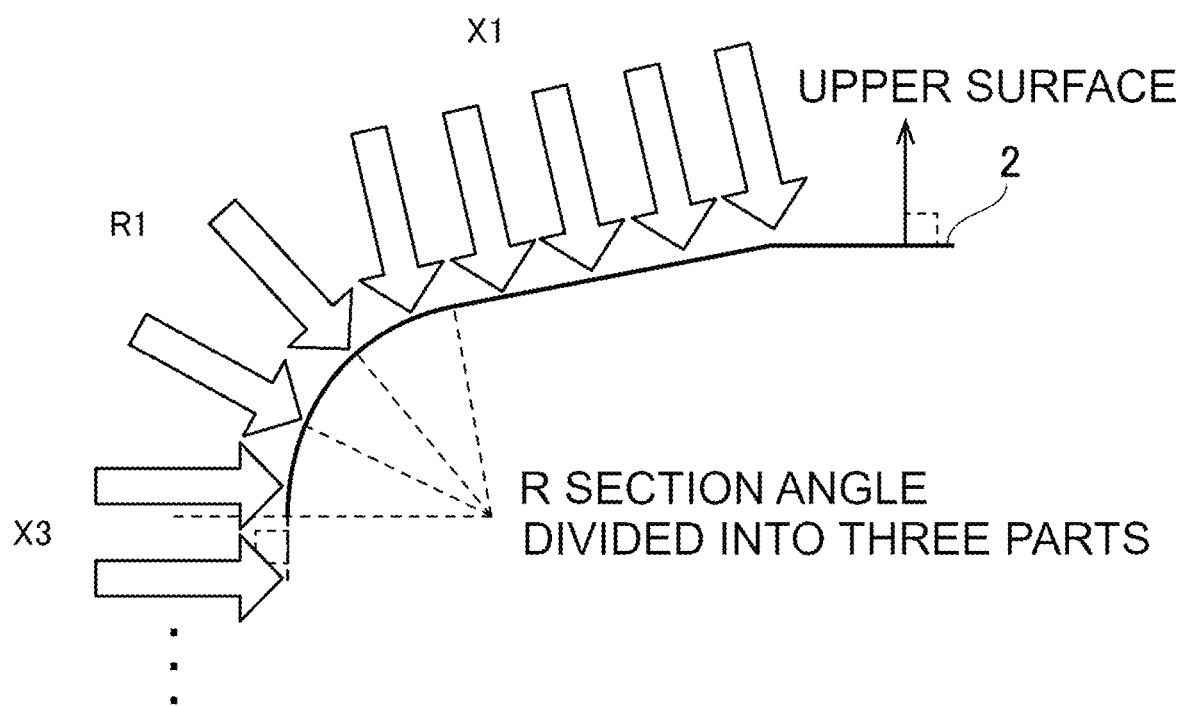
FIG. 13 is a detailed view showing the cross-sectional shape of an edge portion of the outer peripheral portion and an imaging direction.

FIG. 13 is a detailed view showing the cross-sectional shape and imaging direction of the edge portion 5 of the outer peripheral portion. The arrow indicates the direction of incidence of parallel light from the imaging system 10. The cross-sectional shape changes from the upper surface 2 of the measurement object 1 to the inclined surface X1, the R section R1, and reaches the end surface X3 perpendicular to the upper surface 2.

Figure 14A:
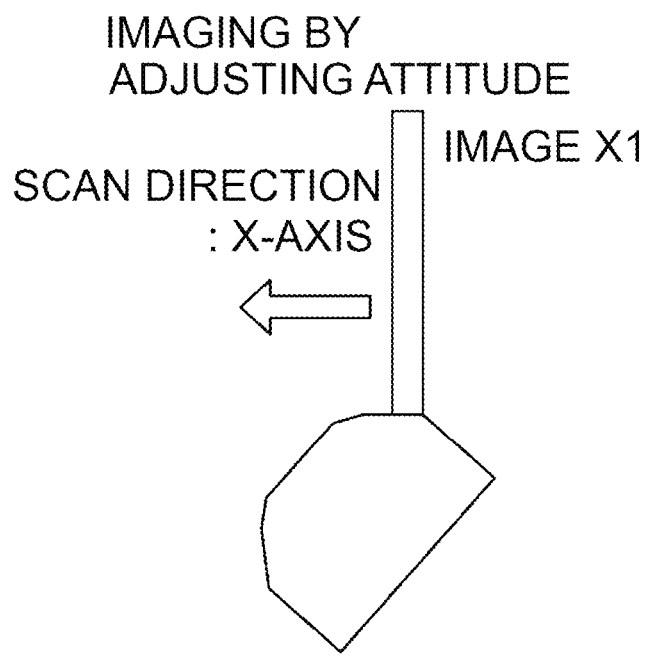
FIG. 14A is an explanatory diagram of attitude adjustment when acquiring a surface image of an edge portion of the outer peripheral portion an inclined surface X1.
Figure 14B:
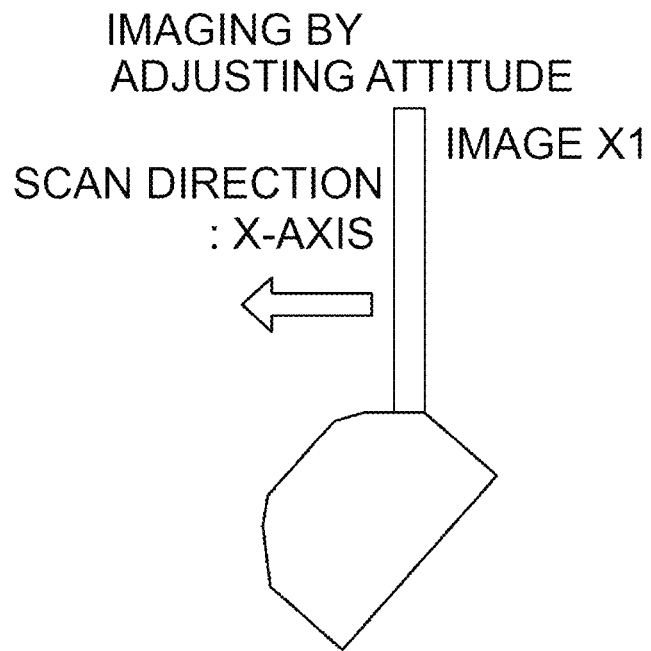
FIG. 14B is an explanatory diagram of attitude adjustment when acquiring a surface image of an edge portion of an R section R1.
Figure 14C:
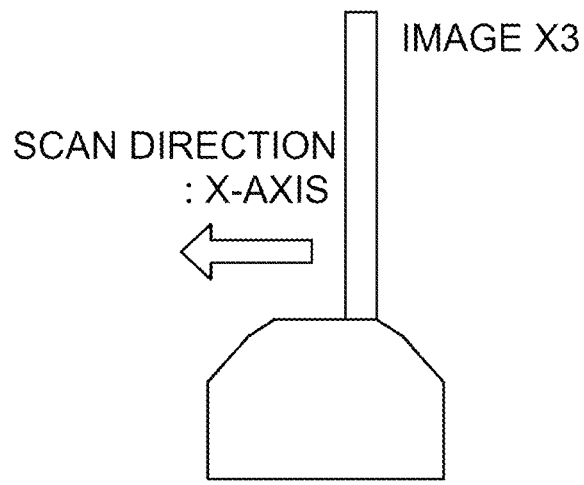
FIG. 14C is an explanatory diagram of attitude adjustment when acquiring a surface image of an edge portion X3 which is perpendicular to the upper surface.
Figure 14D:
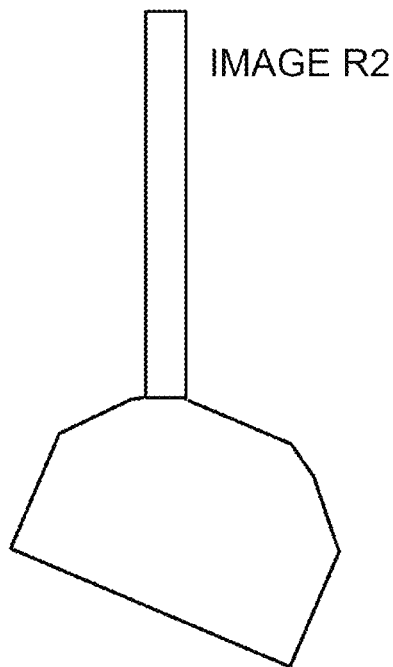
FIG. 14D is an explanatory diagram of attitude adjustment when acquiring a surface image of an edge portion of an R section R2.
Figure 14E:
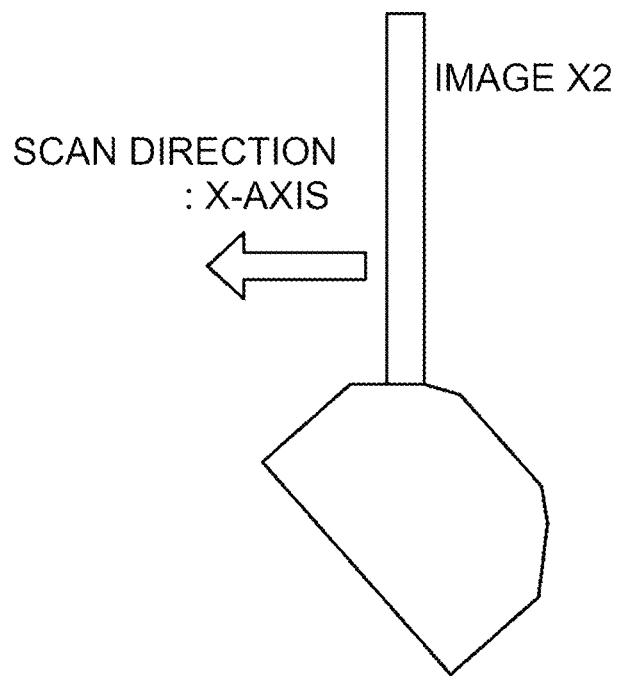
FIG. 14E is an explanatory diagram of attitude adjustment when acquiring a surface image of an edge portion of an inclined surface X2.

FIGS. 14A-14E are explanatory diagrams of attitude adjustment when acquiring a surface image of the edge portion 5 of the outer peripheral portion. When acquiring a surface image of the edge portion 5 of the measurement object 1, the pitch axis is rotated at each part of the edge portion 5 (each part explained in FIG. 9B) to adjust the angle of incidence, and scanning is performed so as to trace the surface. FIGS. 14A, 14C, and 14E show the attitude control method when acquiring the surface images of X1, X3, and X2, respectively, and the attitude control is performed while moving gradually in scan pitch steps.

R1 in FIG. 14B and R2 in FIG. 14D indicate imaging of the R section, and it is preferable to perform imaging by dividing the pitch axis into rotational increments of a predetermined pitch angle. For example, since R1 and R2 are 60 to 70 degrees, it is preferable to divide the pitch axis into three parts.

Figure 15A:
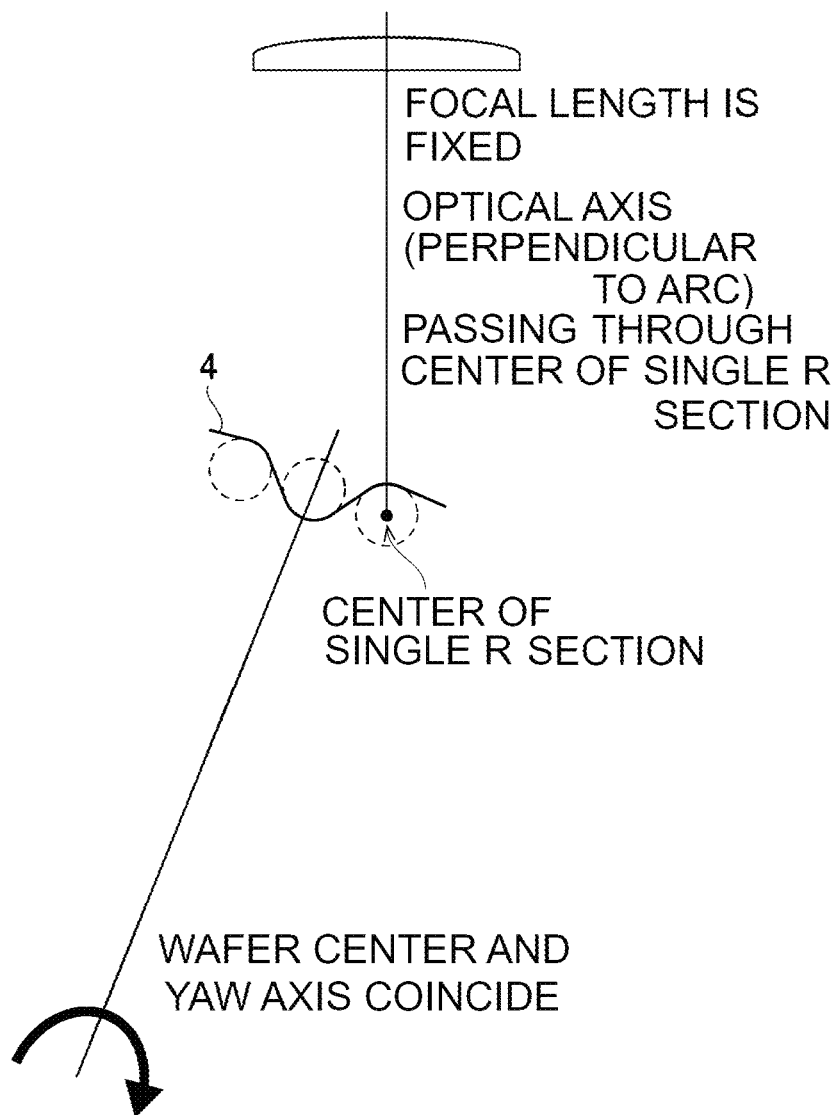
FIG. 15A is an explanatory diagram showing a method for acquiring a surface image of a single R section of X3 (end surface) in a notch portion.
Figure 15B:
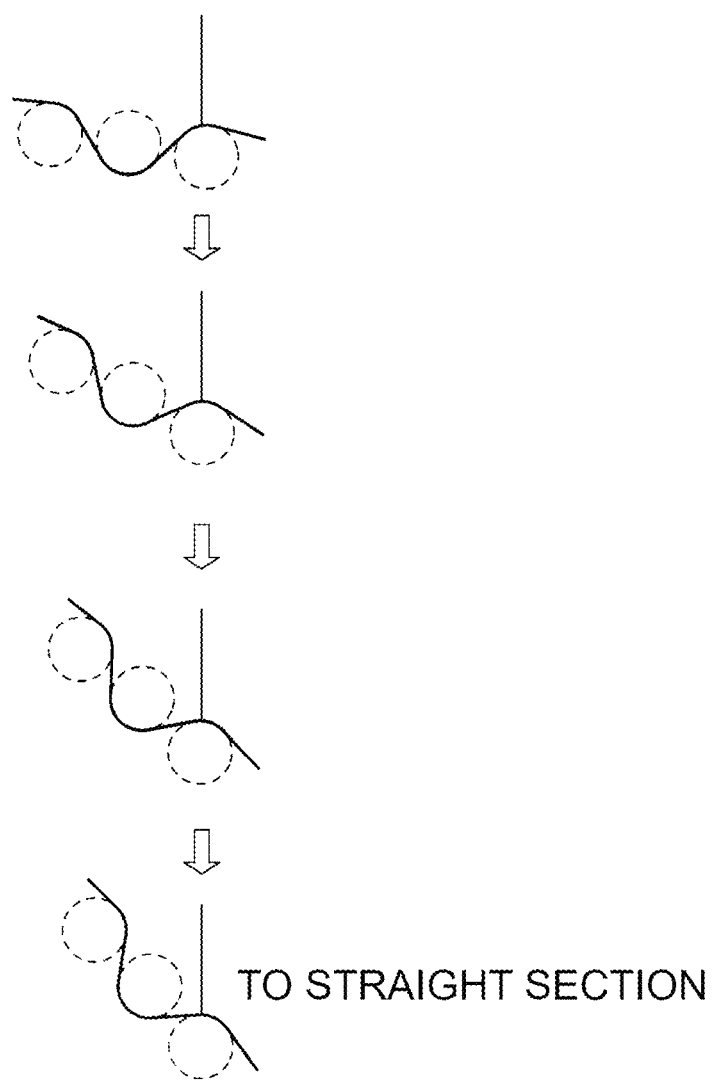
FIG. 15B is a diagram showing an imaging trajectory of a single R section of X3 (end surface) in a notch portion.

FIGS. 15A and 15B are diagrams showing an imaging trajectory of the single R section (1') (see FIG. 9B) of X3 (end surface) of the notch portion 4. When acquiring a surface image of the single R section of the notch portion 4, the attitude adjustment unit 21 fixes the focal length of the imaging system, places the imaging system on an optical axis passing through the center of the single R section (1') as shown in FIG. 15A, and rotates the yaw axis of the chuck table 16 to acquire a surface image.

When the imaging system is placed on the optical axis passing through the center of the single R section (1'), the arc of the single R section and the incidence direction of the parallel light become approximately perpendicular. That is, by performing the attitude adjustment as described above, the entire single R section can be scanned (scanned in the Z-axis and Y-axis directions) while adjusting the angle of incidence within a predetermined range to obtain a surface image.

Then, when the surface image of the single R section is acquired in the above-described manner, it reaches the straight section (2') as shown in FIG. 15B. The same applies to the symmetrical single R section (1).

Figure 16:
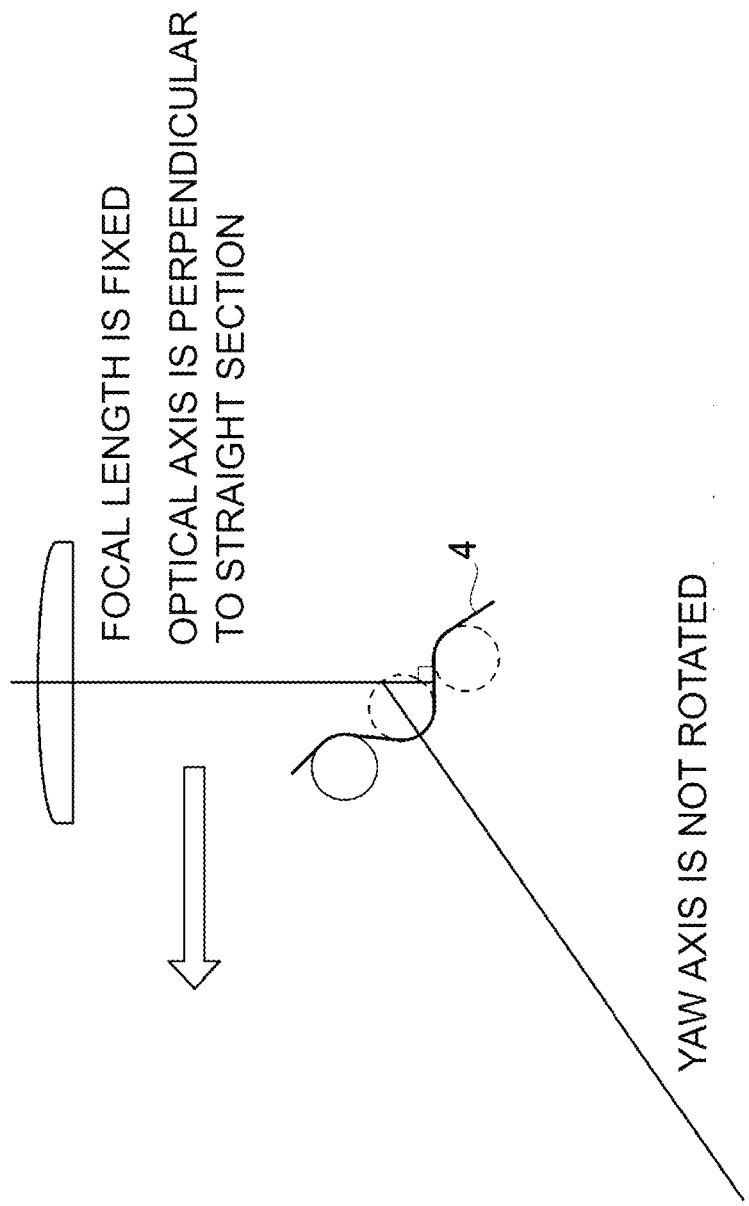
FIG. 16 is a diagram showing an imaging trajectory of a straight section of X3 (end surface) in a notch portion.

FIG. 16 is a diagram showing the imaging trajectory of the straight section (2') (see FIG. 9B) of X3 (end surface) of the notch portion 4. The surface image of the linear portion of the notch portion 4 is obtained by scanning in the Y-axis direction, fixing the focal length and the yaw axis, and adjusting the angle of incidence, as shown in FIG. 16.

Figure 17A:
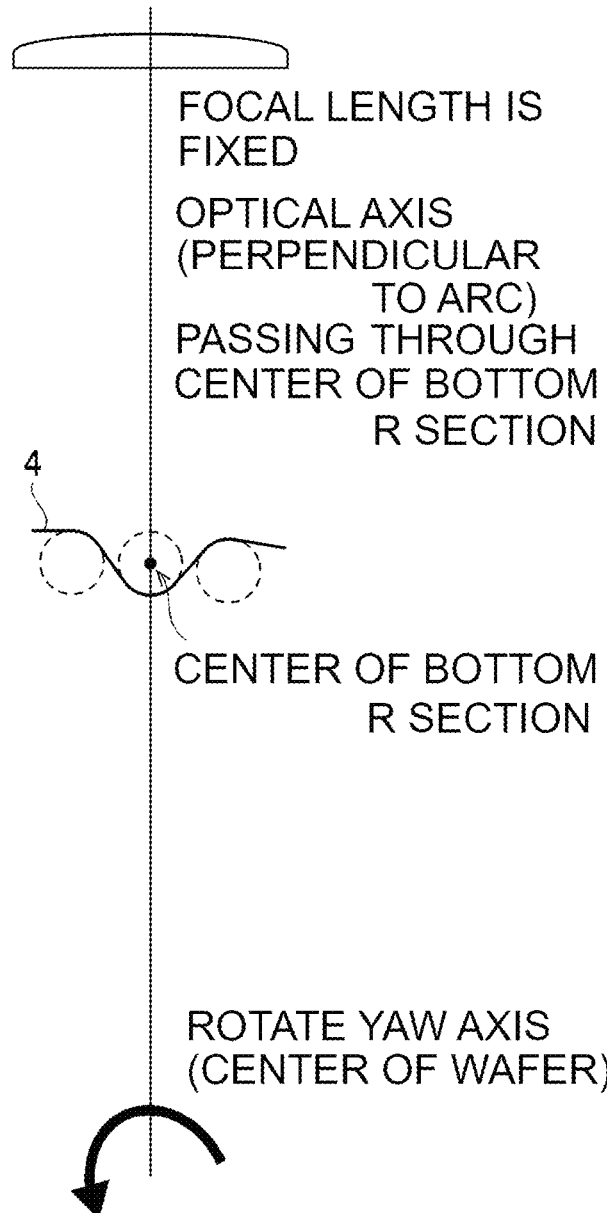
FIG. 17A is an explanatory diagram showing a method for acquiring a surface image of a bottom R section of X3 (end surface) in a notch portion.
Figure 17B:
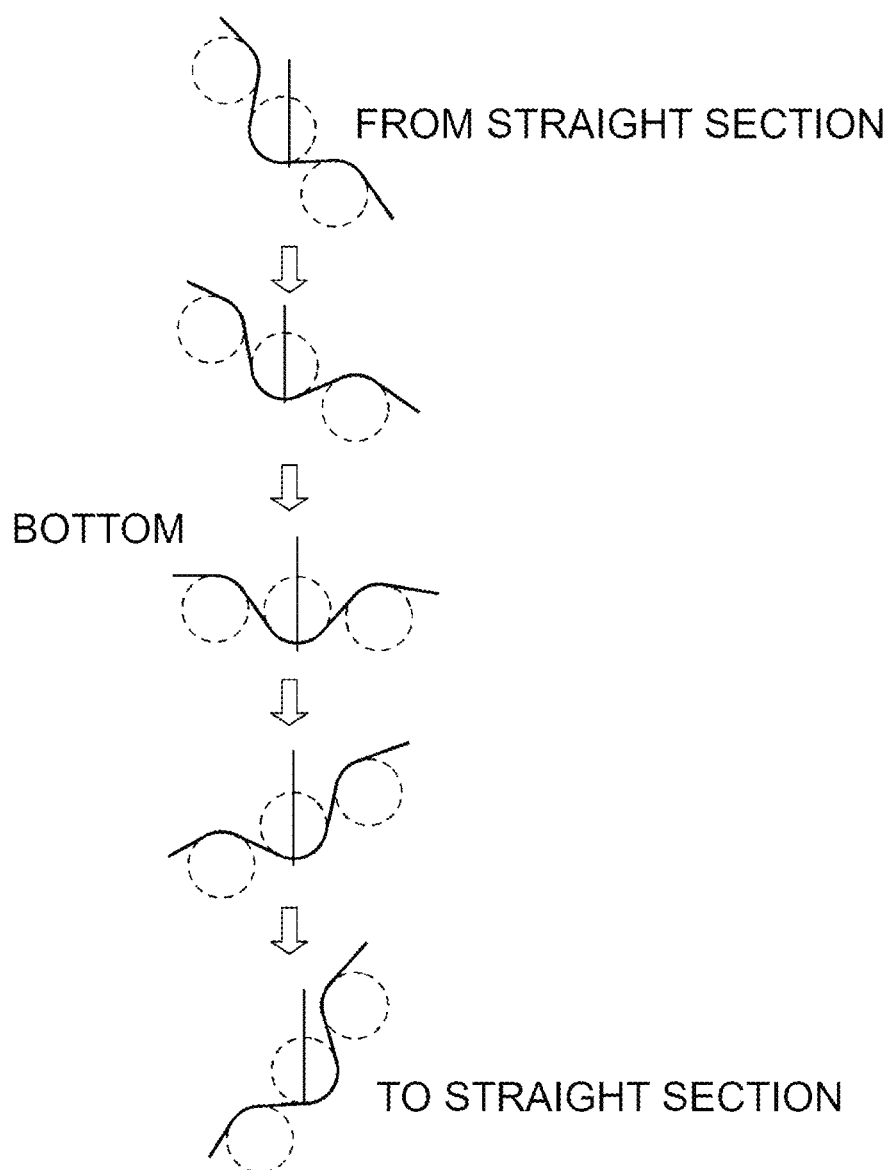
FIG. 17B is a diagram showing an imaging trajectory of a bottom R section of X3 (end surface) in a notch portion.

FIGS. 17A and 17B are diagrams showing the imaging trajectory of the bottom R section (3) of X3 (end surface) of the notch portion 4. As shown in FIG. 17A, the surface image of the bottom R section of the notch portion is obtained by fixing the focal length of the imaging system, placing the imaging system on the optical axis passing through the center of the bottom R section by the rotation control of the yaw axis, adjusting the angle of incidence to approximately 0°, and scanning in the Z-axis and Y-axis directions.

As described above, the surface image of the measurement object 1 is set to the optimum conditions according to the shape of the measurement object 1 by the attitude adjustment unit 21, so even if the surface image is a complicated three-dimensional shape like the notch portion 4, it is also possible to perform shape measurements with high accuracy.

REFERENCE SIGNS LIST

1 Measurement object,
2 Upper surface,
3 Lower surface,
4 Notch portion,
5 Edge portion,
10 Imaging system,
10-1 Light source,
10-10 Polarizing plate,
10-2 Collimating optical system,
10-3 Beam splitter,
10-4 Objective lens,
10-5 Reference mirror,
10-6 Condensing optical system,
10-7 Camera,
10-8 Pinhole,
10-9 Polarizing plate,
15 Baseboard,
16 Chuck table,
20 Control device,
21 Attitude adjustment unit,
22 Image processing unit,
30 Stage system,
100 Shape measurement device

The invention claimed is:

1. A shape measurement device for acquiring a plurality of surface images while scanning a surface of a plate-shaped measurement object and measuring a shape of the measurement object, the shape measurement device comprising:
   a plurality of imaging systems that irradiate the measurement object with parallel light and acquire the surface images;
   an imaging system switching mechanism configured to switch the imaging systems;
   a stage system that holds the measurement object and adjusts an attitude of the measurement object with respect to the imaging systems; and
   a control device that comprises a processor or circuit or computer,
   wherein the control device includes:
   an attitude adjustment unit that controls the imaging systems and the stage system to scan the surface while adjusting the attitude to obtain a plurality of surface images; and
   an image processing unit that generates a restored model of a three-dimensional shape of the measurement object from the plurality of surface images acquired, and
   when acquiring the surface image, the attitude adjustment unit adjusts the attitude so that an angle of incidence of the parallel light onto the surface falls within a predetermined range,
   wherein the control device switches the imaging system to be used to the imaging system determined in advance based on a correspondence relationship with the measurement object; and
   wherein the imaging systems include at least two or more types selected from the group consisting of one for acquiring white interference microscopic images, one for acquiring confocal microscopic images, and one for acquiring images by a photometric stereo method using a polarizing plate.

2. The shape measurement device according to claim 1, wherein the measurement object is a wafer,
   the control device switches the imaging system to:
   the imaging system for acquiring white interference microscopic images when the wafer is a wafer after grinding process; and
   the imaging system for acquiring confocal microscopic images when the wafer is a wafer after etching process; and
   the imaging system for acquiring images by a photometric stereo method when the wafer is a wafer after polishing process.

3. The shape measurement device according to claim 1, wherein
the stage system includes a chuck table having a five-axis structure including three axes, an X-axis, a Y-axis, and a Z-axis, as well as two other axes, a yaw axis for rotation and a pitch axis for tilting.

4. The shape measurement device according to claim 3, wherein
the measurement object is a wafer, and
when acquiring the surface image of an edge portion of the wafer, the attitude adjustment unit executes:
rotating the pitch axis with respect to an inclined surface or an end surface to adjust the angle of incidence, and acquiring the surface image while allowing the imaging system to scan in the X-axis direction; and
rotating the yaw axis to acquire the surface image of an outer peripheral portion.

5. The shape measurement device according to claim 4, wherein
when acquiring the surface image of an R section of the wafer,
the attitude adjustment unit divides the pitch axis into rotational increments of a predetermined pitch angle to obtain the surface image.

6. The shape measurement device according to claim 3, wherein
the measurement object is a wafer, and
when acquiring the surface image of a single R section of a notch portion of the wafer,
the attitude adjustment unit fixes a focal length of the imaging system, places the imaging system on an optical axis passing through a center of the single R section, and rotates the yaw axis to acquire the surface image.

7. The shape measurement device according to claim 3, wherein
the measurement object is a wafer, and
when acquiring the surface image of a straight section of a notch portion,
the attitude adjustment unit fixes a focal length of the imaging system and the yaw axis and adjusts the angle of incidence.

8. The shape measurement device according to claim 3, wherein
the measurement object is a wafer, and
when acquiring the surface image of a bottom R section of a notch portion of the wafer, the attitude adjustment unit fixes a focal length of the imaging system, places the imaging system on an optical axis passing through a center of the bottom R section, and acquires the surface image while scanning in the Z-axis and Y-axis directions.

9. A shape measurement device for acquiring a plurality of surface images while scanning a surface of a plate-shaped measurement object and measuring a shape of the measurement object, the shape measurement device comprising:
a plurality of imaging systems that irradiate the measurement object with parallel light and acquire the surface images:
an imaging system switching mechanism configured to switch the imaging systems;
a stage system that holds the measurement object and adjusts an attitude of the measurement object with respect to the imaging systems; and
a control device that comprises a processor or circuit or computer,
wherein the control device includes:
an attitude adjustment unit that controls the imaging systems and the stage system to scan the surface while adjusting the attitude to obtain a plurality of surface images; and
an image processing unit that generates a restored model of a three-dimensional shape of the measurement object from the plurality of surface images acquired, and
when acquiring the surface image, the attitude adjustment unit adjusts the attitude so that an angle of incidence of the parallel light onto the surface falls within a predetermined range,
wherein the control device switches the imaging system to be used to the imaging system determined in advance based on a correspondence relationship with the measurement object;
wherein the attitude adjustment unit determines an amount of adjustment based on design data of a three-dimensional shape of the measurement object that is stored in advance, and
wherein the imaging systems include at least two or more types selected from the group consisting of one for acquiring white interference microscopic images, one for acquiring confocal microscopic images, and one for acquiring images by a photometric stereo method using a polarizing plate.

10. The shape measurement device according to claim 9, wherein
the measurement object is a wafer,
the control device switches the imaging system to:
the imaging system for acquiring white interference microscopic images when the wafer is a wafer after grinding process; and
the imaging system for acquiring confocal microscopic images when the wafer is a wafer after etching process; and
the imaging system for acquiring images by a photometric stereo method when the wafer is a wafer after polishing process.

11. The shape measurement device according to claim 9, wherein
the stage system includes a chuck table having a five-axis structure including three axes, an X-axis, a Y-axis, and a Z-axis, as well as two other axes, a yaw axis for rotation and a pitch axis for tilting.

12. The shape measurement device according to claim 11, wherein
the measurement object is a wafer, and
when acquiring the surface image of an edge portion of the wafer, the attitude adjustment unit executes:
rotating the pitch axis with respect to an inclined surface or an end surface to adjust the angle of incidence, and acquiring the surface image while allowing the imaging system to scan in the X-axis direction; and
rotating the yaw axis to acquire the surface image of an outer peripheral portion.

13. The shape measurement device according to claim 12, wherein
when acquiring the surface image of an R section of the wafer,
the attitude adjustment unit divides the pitch axis into rotational increments of a predetermined pitch angle to obtain the surface image.

14. The shape measurement device according to claim 11, wherein
the measurement object is a wafer, and
when acquiring the surface image of a single R section of a notch portion of the wafer, the attitude adjustment unit fixes a focal length of the imaging system, places the imaging system on an optical axis passing through a center of the single R section, and rotates the yaw axis to acquire the surface image.

15. The shape measurement device according to claim 11, wherein the measurement object is a wafer, and when acquiring the surface image of a straight section of a notch portion, the attitude adjustment unit fixes a focal length of the imaging system and the yaw axis and adjusts the angle of incidence.

16. The shape measurement device according to claim 11, wherein the measurement object is a wafer, and when acquiring the surface image of a bottom R section of a notch portion of the wafer, the attitude adjustment unit fixes a focal length of the imaging system, places the imaging system on an optical axis passing through a center of the bottom R section, and acquires the surface image while scanning in the Z-axis and Y-axis directions.

\* \* \* \* \*